(12) United States Patent
Sandhu et al.

(10) Patent No.: US 11,354,622 B1
(45) Date of Patent: Jun. 7, 2022

(54) SYSTEMS AND METHODS FOR THIRD PARTY WAREHOUSE INTEGRATION

(71) Applicant: CaaStle, Inc., New York, NY (US)

(72) Inventors: Gurpinder Singh Sandhu, New Delhi (IN); Alisha Tayal, Gurugram (IN); Deepak Kumar, Gurugram (IN); Kapil Saxena, Greater Noida (IN); Prashant Rao, Sunnyvale, CA (US); Jonathan Kaye, San Jose, CA (US); Prashant T R Rao, San Jose, CA (US); Georgiy Goldenberg, Los Altos, CA (US); David Sabel, Saratoga, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 17/533,677

(22) Filed: Nov. 23, 2021

(51) Int. Cl.
*G06Q 10/00* (2012.01)
*G06Q 10/08* (2012.01)

(52) U.S. Cl.
CPC ..... *G06Q 10/0875* (2013.01); *G06Q 10/0837* (2013.01); *G06Q 10/0838* (2013.01)

(58) Field of Classification Search
CPC .......... G06Q 10/0875; G06Q 10/0837; G06Q 10/0838
USPC .......................................................... 705/29
See application file for complete search history.

(56) References Cited

FOREIGN PATENT DOCUMENTS

WO  WO-2014205273 A2 * 12/2014 ............... B07C 3/18

* cited by examiner

*Primary Examiner* — Russell S Glass
(74) *Attorney, Agent, or Firm* — Bookoff McAndrews, PLLC

(57) ABSTRACT

A method for communicating between an internal server system and an external warehouse system for a plurality of articles, the method including receiving an Inventory Snapshot Entity from the external warehouse system, selecting the one or more unique article identifiers from the Inventory Snapshot Entity to be included in an Order Entity, dropping the Order Entity to the external warehouse system, receiving a Return Entity from the external warehouse system, and in response to receiving the Return Entity, updating one or more article databases to indicate receiving one or more articles corresponding to the one or more unique article identifiers.

20 Claims, 11 Drawing Sheets

800

802 — RECEIVING, BY THE INTERNAL SERVER SYSTEM, AN INVENTORY SNAPSHOT ENTITY FROM THE EXTERNAL WAREHOUSE SYSTEM, THE INVENTORY SNAPSHOT ENTITY INDICATING A ONE OR MORE UNIQUE ARTICLE IDENTIFIERS THAT ARE CURRENTLY AVAILABLE IN THE EXTERNAL WAREHOUSE SYSTEM FOR ORDER DROPPING, WHEREIN THE ONE OR MORE UNIQUE ARTICLE IDENTIFIERS CORRESPONDS TO AN ARTICLE OF THE PLURALITY OF ARTICLES

804 — IN RESPONSE TO THE RECEIVING, SELECTING, BY THE INTERNAL SERVER SYSTEM, THE ONE OR MORE UNIQUE ARTICLE IDENTIFIERS FROM THE INVENTORY SNAPSHOT ENTITY TO BE INCLUDED IN AN ORDER ENTITY, THE ORDER ENTITY INCLUDING THE ONE OR MORE UNIQUE ARTICLE IDENTIFIERS AND A CORRESPONDING UNIQUE ARTICLE IDENTIFIER INFORMATION FOR EACH OF THE ONE OR MORE UNIQUE ARTICLE IDENTIFIERS, THE CORRESPONDING UNIQUE ARTICLE IDENTIFIER INFORMATION INCLUDING AN EXTERNAL WAREHOUSE UNIQUE IDENTIFIER

806 — DROPPING, BY THE INTERNAL SERVER SYSTEM, THE ORDER ENTITY TO THE EXTERNAL WAREHOUSE SYSTEM, THE EXTERNAL WAREHOUSE SYSTEM SELECTING AND PREPARING EACH ARTICLE CORRESPONDING TO THE EXTERNAL WAREHOUSE UNIQUE IDENTIFIER IN THE ORDER ENTITY FOR SHIPMENT

808 — RECEIVING, BY THE INTERNAL SERVER SYSTEM, A RETURN ENTITY FROM THE EXTERNAL WAREHOUSE SYSTEM INDICATING THAT THE EXTERNAL WAREHOUSE SYSTEM RECEIVED THE ARTICLE, THE RETURN ENTITY INCLUDING THE ONE OR MORE UNIQUE ARTICLE IDENTIFIERS CORRESPONDING TO AT LEAST ONE ARTICLE AND AN EXTERNAL WAREHOUSE UNIQUE RETURN IDENTIFIER

810 — IN RESPONSE TO RECEIVING THE RETURN ENTITY, UPDATING, BY THE INTERNAL SERVER SYSTEM, ONE OR MORE ARTICLE DATABASES TO INDICATE RECEIVING THE ONE OR MORE ARTICLES CORRESPONDING TO THE ONE OR MORE UNIQUE ARTICLE IDENTIFIERS

RECEIVING, BY THE INTERNAL SERVER SYSTEM, A UNIQUE ARTICLE IDENTIFIER HISTORY ENTITY FROM THE EXTERNAL WAREHOUSE SYSTEM, THE UNIQUE ARTICLE IDENTIFIER HISTORY INCLUDING A UNIQUE ARTICLE IDENTIFIER LOCATION AT A PERIOD OF TIME — 908

TRANSMITTING, BY THE INTERNAL SERVER SYSTEM, A UNIQUE ARTICLE IDENTIFIER INFORMATION ENTITY TO INDICATE TO THE EXTERNAL WAREHOUSE SYSTEM THAT A UNIQUE ARTICLE IDENTIFIER HAS AN INACTIVE STATUS OR AN ACTIVE STATUS, WHERE THE INACTIVE STATUS INDICATES THAT THE UNIQUE ARTICLE IDENTIFIER SHOULD NOT BE INCLUDED IN ONE OR MORE FUTURE INVENTORY SNAPSHOT ENTITIES — 912

WHEREIN THE UNIQUE ARTICLE IDENTIFIER INFORMATION ENTITY INCLUDES AT LEAST ONE OF: THE UNIQUE ARTICLE IDENTIFIER, AN EXTERNAL UNIQUE ARTICLE INDENTIFIER GENERATED BY THE EXTERNAL WAREHOUSE SYSTEM, THE INACTIVE STATUS, OR THE ACTIVE STATUS — 914

SENDING, BY THE INTERNAL SERVER SYSTEM, A REMOVAL ENTITY REQUESTING THE EXTERNAL WAREHOUSE SYSTEM TO DEACTIVATE THE AT LEAST ONE UNIQUE ARTICLE IDENTIFIER, THE EXTERNAL WAREHOUSE SYSTEM REMOVING THE AT LEAST ONE UNIQUE ARTICLE IDENTIFIER FROM AN INVENTORY OF THE EXTERNAL WAREHOUSE SYSTEM —916

WHEREIN THE REMOVAL ENTITY INCLUDES THE AT LEAST ONE UNIQUE ARTICLE IDENTIFIER, A REMOVAL STATUS, A CREATE DATE TIMESTAMP, AND AN UPDATE DATE TIMESTAMP CORRESPONDING TO A CHANGE IN THE REMOVAL STATUS —918

WHEREIN THE REMOVAL STATUS INCLUDES AT LEAST ONE OF: A REQUESTED STATUS INDICATING THAT THE EXTERNAL WAREHOUSE SYSTEM RECEIVED THE REMOVAL ENTITY, AN IN PROGRESS STATUS INDICATING THAT REMOVAL OF THE AT LEAST ONE UNIQUE ARTICLE IDENTIFIER HAS BEGUN, AND A REMOVED STATUS INDICATING THAT THE AT LEAST ONE UNIQUE ARTICLE IDENTIFIER HAS BEEN REMOVED FROM THE INVENTORY —920

ASSOCIATING, BY THE INTERNAL SERVER SYSTEM, THE ORDER ENTITY WITH A TENANT IDENTIFIER —922

*FIG. 9D*

SYSTEMS AND METHODS FOR THIRD PARTY WAREHOUSE INTEGRATION

TECHNICAL FIELD

The present disclosure relates generally to the field of communication between an e-commerce (e.g., clothing as a service or "CaaS") business and an external warehouse providing logistic services and, more particularly, to systems and methods for standardizing a communication data model to assist a third party warehouse integration with a multi-tenant-capable e-commerce business.

BACKGROUND

The clothing and fashion industry has traditionally depended on a business model where users purchase goods from physical retail locations. Such goods are often discarded by the user while the item is in good condition or even excellent condition. Numerous retail locations are necessary to attract users and provide sufficient space for the display of items and to stock items of different styles, sizes, etc. These physical retail locations are operated by teams of employees and are both labor-intensive and expensive to maintain. Additionally, each physical location may only attract users within a narrow geographic area. It is also expensive and difficult to adapt multiple retail locations to rapidly-changing trends.

Although many industries have successfully migrated to Internet-connected platforms, the clothing industry largely remains dependent on physical retail stores and traditional business models. Even when a sale of clothing is performed over the Internet, the item may still be used infrequently by a single user before being discarded. Thus, the fashion and clothing industry also produces significant waste. Accordingly, there is a need to transition to more efficient practices.

Various challenges face retailers seeking to transition to alternate strategies that provide items for short-term or temporary use. One such challenge lies in the ability for a retailer to expand their capabilities, for example by increasing warehouse capacity by constructing additional facilities or integrating with one or more third party warehouse partners, which are managed by entities different from the retailer. Such integration involves communication between the e-commerce business and the third party warehouse partner. However, conventional systems are unable to facilitate direct communication. There exists a need for standardized communication and data model for an e-commerce business to communicate directly with a third party warehouse partner. Thus, the present disclosure relates generally to the field of integration between an e-commerce (e.g., CaaS) business and a warehouse providing clothing logistic services and, more particularly, to systems and methods for a standardized communication data model to assist a third party warehouse integration with an e-commerce business.

SUMMARY OF THE DISCLOSURE

According to certain aspects of the disclosure, systems and methods are disclosed for communicating between an internal server system and an external warehouse system for a plurality of articles.

In one aspect, a method for communicating between an internal server system and an external warehouse system for a plurality of articles may include receiving, by the internal server system, an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles. The method may also include in response to the receiving, selecting, by the internal server system, the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier. The method may also include dropping, by the internal server system, the Order Entity to the external warehouse system, the external warehouse system selecting and preparing each article corresponding to the external warehouse unique identifier in the Order Entity for shipment. The method may also include receiving, by the internal server system, a Return Entity from the external warehouse system indicating that the external warehouse system received the article, the Return Entity including the one or more unique article identifiers corresponding to at least one article and an external warehouse unique return identifier. The method may also in response to receiving the Return Entity, updating, by the internal server system, one or more article databases to indicate receiving one or more articles corresponding to the one or more unique article identifiers.

In another aspect, a computer system for communicating between an internal server system and an external warehouse system for a plurality of articles, the computer system including a memory having processor-readable instructions stored therein, and one or more processors configured to access the memory and execute the processor-readable instructions, which when executed by the one or more processors configures the one or more processors to perform a plurality of functions. The plurality of functions may include receiving, by the internal server system, an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles. The plurality of functions may further include in response to the receiving, selecting, by the internal server system, the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier. The plurality of functions may further include dropping, by the internal server system, the Order Entity to the external warehouse system, the external warehouse system selecting and preparing each article corresponding to the external warehouse unique identifier in the Order Entity for shipment. The plurality of functions may further include receiving, by the internal server system, a Return Entity from the external warehouse system indicating that the external warehouse system received the article, the Return Entity including the one or more unique article identifiers corresponding to at least one article and an external warehouse unique return identifier. The plurality of functions may further include in response to receiving the Return Entity, updating, by the internal server system, one or more article databases to indicate receiving one or more articles corresponding to the one or more unique article identifiers.

In another aspect, a non-transitory computer-readable medium containing instructions for performing functions for communicating between an internal server system and an external warehouse system for a plurality of articles, the functions including receiving an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles. The functions may further include in response to the receiving, selecting the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier. The plurality of functions may further include dropping the Order Entity to the external warehouse system, the external warehouse system selecting and preparing each article corresponding to the external warehouse unique identifier in the Order Entity for shipment. The plurality of functions may further include receiving a Return Entity from the external warehouse system indicating that the external warehouse system received the article, the Return Entity including the one or more unique article identifiers corresponding to at least one article and an external warehouse unique return identifier. The plurality of functions may further include in response to receiving the Return Entity, updating one or more article databases to indicate receiving one or more articles corresponding to the one or more unique article identifiers.

BRIEF DESCRIPTION OF THE DRAWINGS

It is believed that certain embodiments will be better understood from the following description taken in conjunction with the accompanying drawings, in which like references indicate similar elements and in which:

FIG. 8 is a flowchart of an exemplary method for communicating between an internal server system and an external warehouse system for a plurality of articles, according to one or more embodiments.

FIGS. 9A, 9B, 9C, and 9D illustrate a series of exemplary flowcharts for communicating between an internal server system and an external warehouse for a plurality of articles, according to one or more embodiments.

DETAILED DESCRIPTION OF EMBODIMENTS

Figure 1:
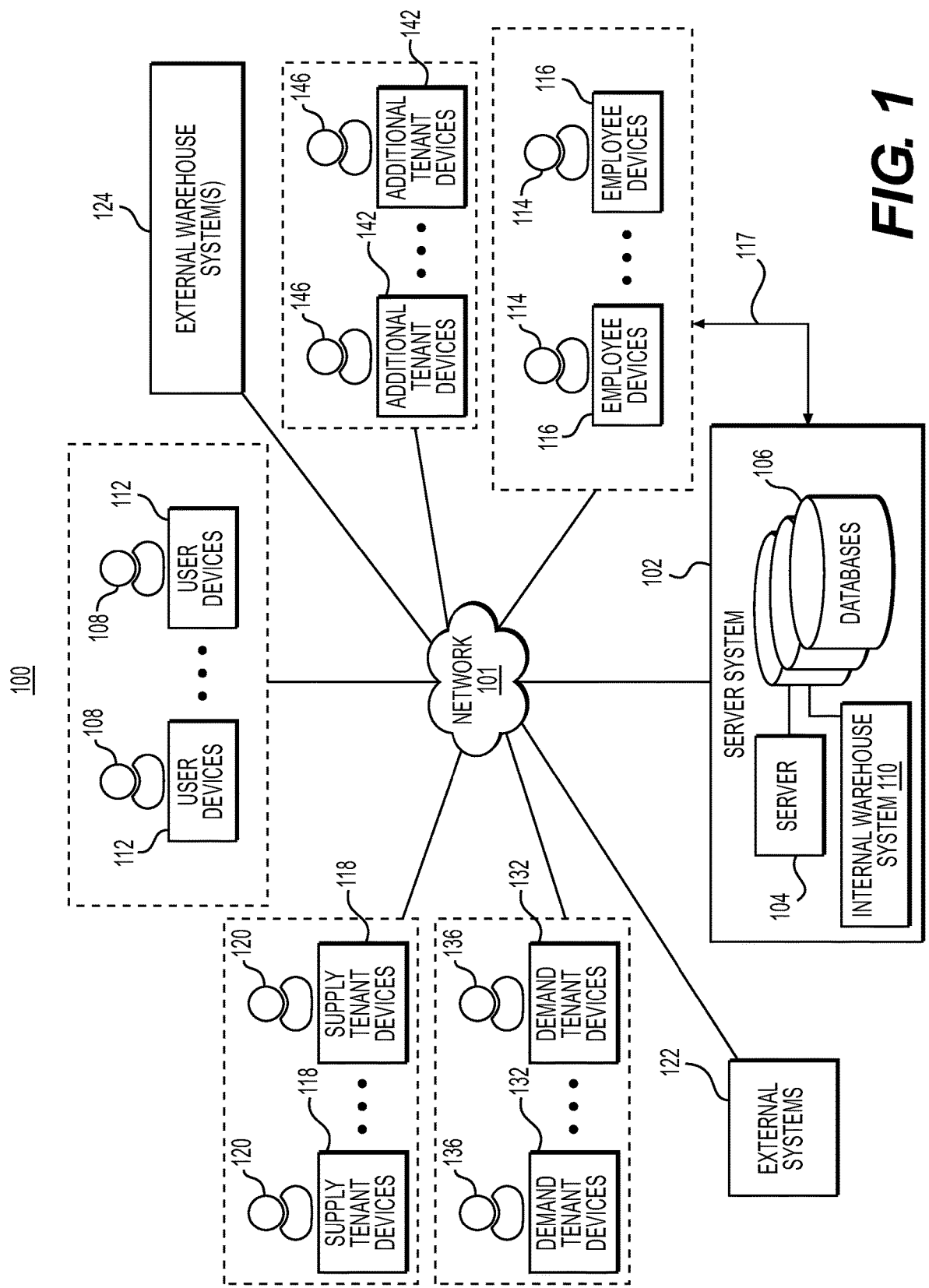
FIG. 1 is a block diagram of an exemplary environment in which methods, systems, and other aspects of the present disclosure may be implemented.

The following embodiments describe systems and methods for a standardized communication data model to assist a third party warehouse integration with an e-commerce business. As noted above, there exists a need for a standardized communication and data model that allows an e-commerce business to communicate directly with a third party warehouse partner.

While the exemplary system architecture as described in the present disclosure relates to electronic transactions for subscribing to, purchasing, or renting articles, such as wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel" or "garments," all of those transactions may effectively serve any wearable item (e.g., an article of clothing, apparel, jewelry, hat, accessories, or any other product which may be worn), or hospitality linens, user goods, or any other textile fabrics, without departing from the scope of the disclosure.

An e-commerce business (e.g., clothing-as-a-service ("CaaS")) may provide wearable items to businesses and/or end-user individual users on a temporary basis, and in at least some cases, on a permanent basis (e.g., as a "try then buy" service). A warehouse (or distribution center) may refer to a facility that processes articles, such as wearable articles, including wearable items, and provides the functions and services (described in further detail below) to support the e-commerce business. A user may pay the e-commerce business to keep one or more wearable items for a period of time. However, the user may not own the wearable items unless the user decides to purchase such wearable items. For example, a typical CaaS may involve: (1) the selection of a set of wearable items to be sent to a user; (2) picking the wearable items, packing such wearable items in one or more boxes, and then shipping the one or more multiple boxes from the warehouse to the user; (3) the user receiving the one or more boxes and keeping the wearable items for some period of time; and/or (4) the user returning some or all of the wearable items by shipping such wearable items back to the warehouse in one or multiple boxes.

Example services that the CaaS may provide may include a subscription service, a borrowing service, a try then buy (TTB) service, and/or an expedited shipment service. When a user uses the subscription service, the user pays regularly (monthly, etc.) to receive a set of wearable items. The CaaS may provide the user with an option to choose wearable items or provide a set of preferred wearable items, among which the user can receive any wearable item. Once the user receives the set of preferred wearable items, the user may keep the wearable items for a period of time. The user may then return the wearable items to the warehouse to receive a new set of wearable items.

When a user uses the borrowing services, the user may keep a wearable item, or a set of wearable items, for a pre-defined period of time or indefinitely, after which the user may return the wearable item to the warehouse. The TTB service may be applicable for both the subscription service and the borrowing services. In both of the services, the user may be given an option to buy the wearable items that the user currently has at his or her home. After paying the sales price for the wearable item(s) as defined by the CaaS business, the user becomes the owner of the wearable item(s). The user may be given an option to extend the period of time, by paying additional fees. When a user uses the expedited shipment service, the CaaS business provides an option for users to opt for expedited shipment of the wearable item or set of wearable items, in exchange for an additional payment that is over and above the monthly subscription charges.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, user service, warehouse operations, clothing rental business (CRB), etc.). As used in the present disclosure, the terms "wearable item" or "clothing" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more wearable articles for a future transaction).

The term "order" may refer to shipping a set of wearable items from a warehouse to a user. For example, once a set of items has been selected to be sent to a user, such set of items is picked, packed, and shipped to a user. The term "return" may refer to the process of receiving a wearable article at the warehouse once a user returns a set of wearable items. The term "retire" may refer to the process of disposing one or more wearable items once such wearable items have become unusable due to quality issues or other reasons. The term "retire" may also refer to the process of ensuring other items with the same group identifier are no longer rented or offered for rent. The term "reconciliation" may refer to the process of comparing and/or correcting data/information about wearable items. More specifically, the reconciliation process may include comparing and/or correcting data/information between an internal electronic system and the physical availability of wearable items in the warehouse. The term "inventory snapshot" may refer to the ability to receive a real-time view of all the inventory present, and available for matching, in a warehouse, such as a third party warehouse. The term "receiving" may refer to the process of receiving new wearable items into the warehouse. The term "laundry" may refer to the process of cleaning a wearable item once such wearable item is returned by a user or if quality issues arise, inclusive of wet cleaning and dry cleaning. The term "inspection" may refer to the process of checking if a wearable item passes one or more quality standards set with the CaaS system. The term "repair" may refer to the process of fixing a wearable item that has wear and tear. Repair may also include specialized cleaning of wearable items in some cases. It should be appreciated that some or all of the previously described functions and services may be provided manually or using electronic systems outside of the present disclosure.

The term "group identifier" may refer to a label used to identify and track items in a warehouse of a certain type. Items having the same group identifier may be indistinguishable (ignoring wear and tear and other unimportant features) from each other. For example, in the situation where the item is a garment, the group identifier may define a particular pattern, color, and/or size. This may result in all wearable items of the same pattern, color, and/or size having the same group identifier. By way of further example, if there are 10 quantities of a blue dress of a size "large," all of the blue dresses may have a group identifier of "ABC123." A "group identifier," or "article grouping identifier," may include a "stock keeping unit" or "SKU".

As described above, all indistinguishable items may have the same group identifier. However, to track and identify each individual item of the indistinguishable items, a unique label, which may be referred to as a "unique article identifier," may be associated with each individual item, where the unique label may be unique among all items. For example, continuing with the previous example of 10 quantities of a blue dress of a size "large," may each have a unique article identifier of ABC123-01, ABC123-2, etc. While the group identifier and unique article identifier may share a subset of characters as in this example, the group identifier and unique article identifier for a particular article may instead be entirely distinct from each other.

The term "tenant" may refer to an entity that a CaaS system may serve on its platform, each tenant having a relationship with one or more users and/or with another tenant. A tenant may use the CaaS system platform to rent its own inventory to users on a subscription basis. Furthermore, a label called "tenantId" may be associated with each tenant to uniquely identify each tenant. As a result, the "tenantId" may electronically represent a tenant among a plurality of tenants.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. For example, the system may periodically collect vast amounts of data attributes from historical transactions, form data sets indicative of each user's relationship with certain apparel (e.g., a binary flag of whether a shipped garment was actually worn by a user) in the back end, and train a neural network with those data sets to make specific front-end user recommendations with highly wearable apparel. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

I. Exemplary CaaS System Environment

Referring now to the drawings, FIG. 1 shows an example environment 100, according to one or more embodiments of the present disclosure. As shown, the example environment 100 may include one or more networks 101 that interconnect a server system 102, user devices 112, employee devices 116, tenant devices 118, 132, 142, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 118, 132, 142 may be accessed by end-users associated with different tenant entities 120, 136, 146, as described below. In some implementations, employee devices 116 may be used to perform or supplement the functions of the tenant devices 118, 132, 142 and/or the user devices 112. A server system 102 may be, for example, an internal server system. The server system 102 may comprise one or more servers 104, internal warehouse system 110, one or more databases 106, which may be configured to store and/or process a plurality of data, microservices, and service components, and/or associated functions thereof, as described in more detail below with respect to FIG. 2.

Users 108 may access the server system 102 through the one or more networks 101 via user devices 112. Each device among the user devices 112 may be any type of computing device (e.g., personal computing device, mobile computing device, etc.) which allows users 108 to display a web browser or a web-based application for accessing the server system 102 through the network 101. User devices 112 may, for example, be configured to display a web browser, a web-based application, or any other user interface (e.g., one or more mobile applications) for allowing users 108 to exchange information with other device(s) or system(s) in environment 100 over the one or more networks 101. For example, user devices 112 may load an application with a graphical user interface (GUI), and the application may display on the GUI one or more apparel recommendations for closeting by the user. Users 108 accessing user devices 112 may be, for example, users and/or potential users of articles made available for subscription-based distribution via electronic transactions and physical shipment. Additionally, or alternatively, users 108 may access user devices 112 to, for example, manage one or more user accounts, view catalogs, configure one or more user profiles, engage in user service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, user service employees, marketer employees, warehouse employees, analytics employees, or any other employees who are authorized and/or authenticated to perform tasks, operations, and/or transactions associated with server system 102, external systems 122, and/or an external warehouse system 124. In one embodiment, employee devices 116 are owned and operated by the same entity or at least an affiliate of the entity operating the e-commerce (e.g., CaaS) business hosted on server systems 102. Each employee device 116 may be any type of computing device (e.g., personal computing device, mobile computing devices, etc.). Employee devices 116 may allow employees 114 to display a web browser or an application for accessing the server system 102 and/or the external systems 122, through the one or more networks 101. For example, an employee device 116 may load an application with graphical user interface (GUI), and the application may display on the GUI one or more warehouse operations associated with providing CaaS to users 108. In some implementations, employee devices 116 may communicate directly with server system 102 via communications link 117, bypassing public networks 101. Additionally, or alternatively, employee devices 116 may communicate with server system 102 via network 101 (e.g., access by web browsers or web-based applications).

Tenant devices 118, 132, 142 may be configured to be accessed by one or more tenants, such as one or more supply tenants 120, one or more demand tenants 136, and/or one or more additional tenants 146, which may include hybrid tenants and/or facilitation tenants, as described below. Each device among the tenant devices 118, 132, 142 may be any type of computing device (e.g., personal computing device, mobile computing devices, etc.). As used herein, each tenant, including one or more tenants 120, 136, 146, may refer to an entity that receives, supplies, shares, and/or facilitates sharing, for one or more collections of apparel for one or more CaaS inventories, e.g., by utilizing one or more internal warehouse systems 110 included in server system 102 and/or one or more external warehouse systems 124. For example, each tenant 120, 136, 146 may be a retailer, a designer, a manufacturer, a merchandizer, or a brand owner entity that supplies or otherwise makes available one or more collections (e.g., catalogs) of wearable items to one or more CaaS inventories managed and/or accessed by the server system 102.

Tenants 120, 136, 146 may be configured to interact with each other in accordance with respective roles, as described below. For example, supply-side or supply tenants 120 may be entities that provide a plurality of articles to one or more physical inventories that are received by warehouses associated with internal warehouse systems 110 and/or external warehouse systems 124, and ultimately, for use by other tenants, such as one or more demand-side or demand tenants 136. Demand tenants 136 may, via one or more electronic storefronts, make these articles available to one or more users 108.

Tenant devices 118, 132, 142 may serve as access terminals for the tenants 120, 136, 146 for communicating with electronic tenant interfaces and/or other subsystems hosted at server system 102. Tenant devices 118, 132, 142 may, for example, be configured to display a web browser, an application, or any other user interface for allowing tenants 120, 136, 146 to load electronic tenant interfaces and/or exchange data with other device(s) or system(s) in the environment 100 over the one or more networks 101.

External systems 122 and/or external warehouse systems 124 may be, for example, one or more third party and/or auxiliary systems that integrate and/or communicate with the server system 102 in performing various CaaS tasks, e.g., by utilizing one or more internal warehouse systems 110 included in server system 102 and/or one or more external warehouse systems 124. Specific examples of the external systems 122 and external warehouse systems 124 are described in detail below with respect to FIGS. 2 and 3. External systems 122 and external warehouse systems 124 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101. Additionally, for example, external warehouse systems 124 may communicate with the server system 102 via API over the one or more networks.

External warehouse system(s) 124 may be, for example, one or more third party and/or auxiliary warehouse systems that communicate with the server system 102 in performing various CaaS tasks. External warehouse system(s) 124 may be in communication with other device(s) or system(s) in the environment 100 over the one or more networks 101. For example, external warehouse system(s) 124 may communicate with the server system 102 via API access, details of which are described below, over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 118, 132, in addition to their own functions.

II. Exemplary CaaS Architecture

Figure 2:
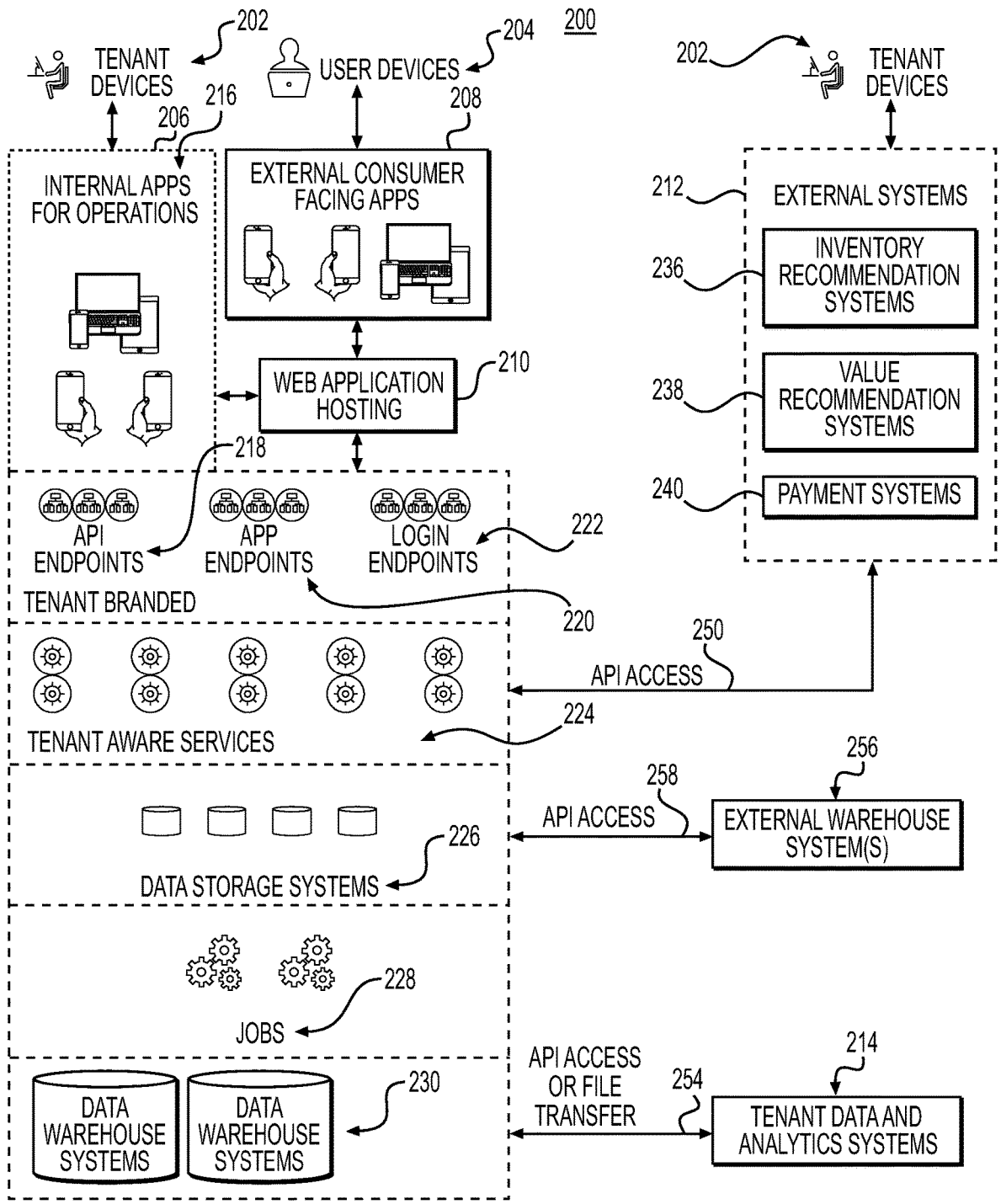
FIG. 2 is a diagram depicting an architecture of an exemplary environment for communicating between an internal server system and an external warehouse system for a plurality of articles, according to one or more embodiments.

FIG. 2 is a schematic diagram of an exemplary architecture 200 for an electronic platform for a CaaS having internal and external warehouse systems, according to one or more embodiments. The components of architecture 200 may be accessed by authorized terminals, such as tenant devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, user devices 204 may correspond to any one or more user devices 112 of users 108 depicted in FIG. 1. One or more of the employee devices 116 depicted in FIG. 1 may also access architecture 200 (e.g., via one or more internal applications). Tenant devices 202 may correspond to tenant devices 118 of supply tenants 120, tenant devices 132 of demand tenants 136, and/or devices 142 of additional (hybrid and/or facilitation) tenants 146. Tenant devices 202 may, in at least some circumstances, also correspond to one or more employee devices 116.

As shown in FIG. 2, in general, architecture 200 may comprise an internal system 206, external user facing apps 208, a web application hosting server 210, external systems 212, external warehouse systems 256, and internal applications for operations 216 which may be part of internal system 206 and/or formed by one or more external tenant facing applications. If desired, architecture 200 may include one or more tenant data and analytics systems (not shown) to assess performance of, for example, individually-branded storefronts of tenants 120, 136, 146. Internal system 206 may comprise internal applications for operations 216, API endpoints 218, APP endpoints 220, login endpoints 222, tenant aware services 224, and inventory data stores or data storage systems 226.

II.A. Internal System

In operation, tenant devices 202 may access internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The outer boundary of the internal system 206 depicted in dashed lines, encompassing subcomponents 216-230 (with applications 216 being depicted in lighter dashed lines to indicate that components may be included in internal and/or external systems), may represent a virtual private cloud allocated for hosting the entirety of the internal system 206. Additionally, the inner boundaries within internal system 206, also depicted in dashed lines, may indicate multiple virtual private clouds (e.g., subsets of the larger virtual private cloud encompassing the internal system 206), each allocated for one or more particular tasks, users, or purposes (e.g., tenant aware services 224, jobs 228, and data warehouse systems 230).

Tenant devices 202 may communicate with internal system 206 through one or more internal applications for operations 216 comprising one or more web-based portals or user interfaces for operations, including operations for accessing an external warehouse system 256. Each portal may generate or present a graphical user interface on a display of one or more tenant devices 202. Internal applications for operations 216 may be, for example, a shared inventory content management system, an inventory transfer portal, an inventory management portal, and/or an exchange facilitation portal, as described in more detail below with respect to FIGS. 3-9D. Tenants 120, 136, 146 may use devices 202 to access internal system 206 to perform inventory management, inventory sharing, valuation, and/or exchange facilitation tasks.

In addition to internal applications for operations 216, internal system 206 may include internal applications, such as one or more web-based user interfaces. These interfaces may include one or more mobile applications compatible with predetermined mobile device operating systems, a software application developed for desktop operating systems, and/or a web site configured for browser access to web pages via one or more networks (e.g., the Internet or an intranet). Employees 114 may use devices employee devices (e.g., user devices 204) to access internal system 206 to perform additional tasks, such as CaaS functions related to warehouse operations and/or administrative tasks.

Internal system 206 may also include Application Programming Interface ("API") endpoints 218, APP (application) endpoints 220, and login endpoints 222. In some implementations, these endpoints may be hosted in a virtual private cloud or a physical private network. API endpoints 218 may be locations from which the APIs can access resources of the internal system 206 that the APIs need to carry out their functions, including functions for managing one or more internal warehouse systems 110. For example, the API endpoints 218 may specify where resources can be accessed by the APIs, while communicating with the APIs requesting information from the internal system 206. APP endpoints 220 may be the locations from which applications (e.g., internal applications for operations 216, one or more internal applications) may access resources of the internal system 206 they need to carry out their functions, and the login endpoints 222 may be the touchpoints of any communication pertaining to logins (e.g., authentication and access control) associated with internal system 206. Login endpoints 222 may receive and process login communications for internal applications for operations 216 and/or external user facing applications 208. At least some endpoints among the API endpoints 218, APP endpoints 220, and login endpoints 222, may be tenant-branded endpoints, designated to serve particular tenants 120, 136, 146.

Figure 3:
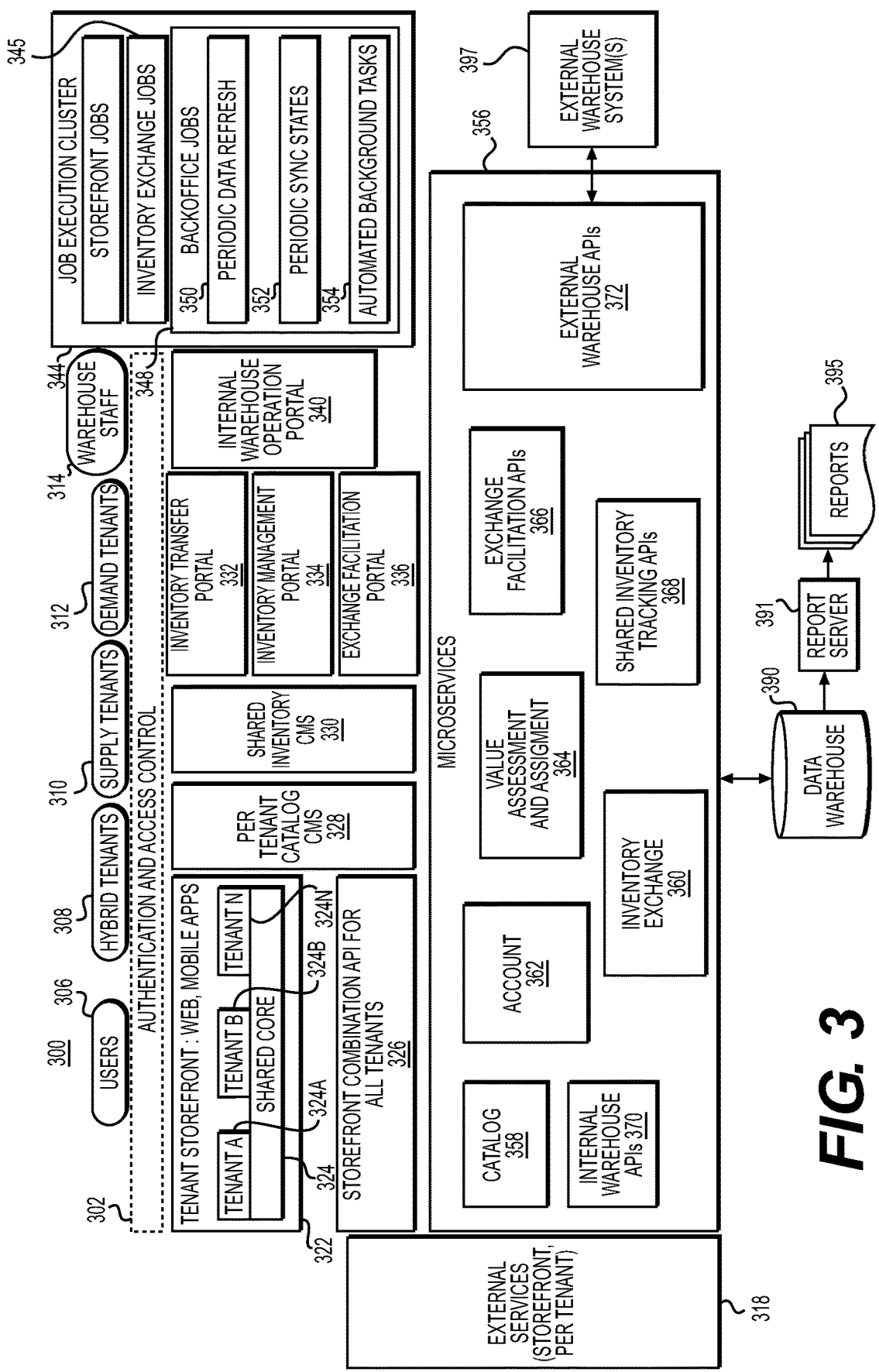
FIG. 3 is a diagram depicting the architecture of an exemplary server system for communicating between an internal server system and an external warehouse system for a plurality of articles, according to one or more embodiments.

Internal system 206 may include tenant aware services 224 and tenant aware transactional data stores 226, as well as data storage systems 226 may be one or more databases that store both raw and processed data resulting from operations of the tenant aware services 224, the endpoints 218-222, external systems 212, and/or tenant data and analytics systems 214. Tenant aware services 224 may include microservices for fulfillment of various CaaS operations hosted in one or more virtual private clouds or one or more physical private networks. In particular, one or more of these microservices may be configured to support inventory exchange, value assessment and assignment, and warehouse functions, as described in more detail below with respect to external warehouse APIs 372 (FIG. 3). Additional microservices of internal system 206 may include, for example, catalog data, account data, data services, user service functions, marketing functions, inventory exchange, and/or other supporting functions.

Data storage system 226 may be one or more databases that store both raw and processed data resulting from operations of tenant aware services 224, endpoints 218-222, external systems 212, external warehouse systems 256, and/or tenant data and analytics systems 214. The data stored in data storage system 226 may include transactional data, batch jobs data, searchable data including various analytics and attributes, event messages, and local logs of various raw data.

Internal system 206 may additionally include jobs 228. Jobs 228 may be hosted in, for example, one or more virtual private clouds. Jobs 228 may also include, for example, periodic data refresh operations, periodic synchronization states among internal and external services, and automated tasks to run in the background at internal system 206, as described in more detail below with respect to job execution cluster 346 (FIG. 3). Additional jobs for internal system 206 for supporting other aspects of CaaS may include, for example, ETL (extract, transform, and load) processes that comprise collecting data from multiple different sources, converting the collected data to other one or more preset formats as deemed necessary, and loading the data into the target database (e.g., data warehouse systems 230). Additional system components useful for jobs of environment 200 may include, for example, replenishment identifier (RID) generation service(s), size advisor data set, size advisor algorithmic preparation component(s), recommendation service(s) for generating recommendations to end users, search data sets, etc.

Internal system 206 may include file stores or databases that store snapshots which may include the above-described snapshot data. For example, snapshots associated with external warehouse systems 397 may be stored in data storage system 226, which may be included in one or more virtual private clouds or one or more physical private networks. Snapshots stored in system 226 may include data representative of a current status of an inventory in the external warehouse systems 397. Other snapshots may capture states of aspects of internal system 206 other than the external warehouse systems 397. For example, each snapshot may capture settings, files, configurations, and the memory state of the components of the internal system 206. These snapshots may be restored upon request or scheduling, and when a snapshot is restored, settings, and/or the state of the internal system 206, including components of the external warehouse system 397, may be returned to the states they were in at the time the snapshots was captured.

Internal system 206 may include the data warehouse systems 230 in one or more virtual private clouds or one or more physical private networks. As discussed above, data warehouse systems 230 may include one or more target databases for ETL processes that collect data from various sources (e.g., external systems 212, data storage systems 226, or external warehouse systems 256). Data warehouse systems 230 may then utilize the collected data as, for example, parameters for business intelligence that reveals patterns, analytics, and insights for inventory sharing. In particular, data warehouse systems 230 may store information useful for performing analytics for an internal warehouse system 110, such as articles that are currently shared in two or more tenant inventories after being offered and selected. Analytics may be performed, based on information of data warehouse systems 230, by components of internal system 206 (e.g., jobs 228) and/or with one or more external systems 212 (e.g., inventory recommendation systems 236 and/or value recommendation systems 238) and/or with one or more external warehouse systems 256.

Analysis of information stored in data warehouse systems 230 may be used for one or more reporting tools useful for monitoring the performance of one or more entities (supply tenants, demand tenants, hybrid tenants, or facilitation tenants) and/or one or more articles involved in the external warehouse system 297. For example, such analyses may be useful for the generation and presentation of information representative of performance analytics of one or more articles offered via an exchange, performance analytics of one or more storefronts presenting articles that are shared via an exchange, performance analytics of a particular tenant (e.g., performance of a tenant's inventory listed in the exchange and/or performance of one or more tenant-specific storefronts), the performance of one or more particular tenant roles (e.g., a group of supply, demand, hybrid, facilitation tenants), etc.

With continued reference to FIG. 2, environment 200 may also include user devices 204, which may correspond to user devices 112 (FIG. 1). Users 108 of the CaaS electronic platform may use the user devices 204 to access the internal system 206, as recipients of the services provided by the components of the internal system 206 (e.g., as subscribing users that receive articles offered as a service, including one or more articles that are present in tenant inventories via inventory exchange, as described below). For example, users 108 of user devices 204 may be one or more registered subscribers who physically receive and wear items that are distributed via the CaaS electronic platform. As shown in FIG. 2, user devices 204 may access the internal system 206 via external user facing applications 208. External user facing applications 208 may be browser-accessed web pages or web-based applications that include web-based user interfaces accessible from one or more user devices 204 over one or more networks (e.g., one or more networks 101).

In some implementations, web application hosting server 210 acts as an intermediary for enabling communications made between tenant devices 202 and internal system 206, between employee devices and internal system 206, and between user devices 204 and internal system 206. Internal system 206 may present different communications interfaces (e.g., applications) based on an identity supplied by devices 202 and 204, such as a tenant, employee, or user. In particular, internal system 206 may further provide different communications interfaces based on a particular role supplied by tenant devices 202 (e.g., a role corresponding to supply tenants 120, demand tenants 136, hybrid tenants, or facilitation tenants).

Web application hosting server 210 may be an external (e.g., third party) server or internal (e.g., intranet, local network) server or host that provides an online platform for an inventory exchange that may be accessed by tenant devices 202. This inventory exchange may provide a management interface (e.g., via inventory management portal 334, described below) for viewing, selecting, and modifying, articles offered in the inventory exchange, and/or a retailer storefront interface (e.g., via inventory transfer portal 332, described below) for interacting with one or more articles offered on the inventory exchange by other tenants which can be selected for inclusion in one or more storefronts. Additionally, the inventory exchange may include a facilitation interface (e.g., via exchange facilitation portal 336) for facilitating exchange (e.g., by browsing items in the inventory exchange and recommending articles to tenants associated with the inventory exchange), as described below. These interfaces, supporting systems and processes (e.g., components of environment 200 and/or server system 300), which are collectively or individually referred to herein as an "inventory exchange," may facilitate the ability of tenants to list one or more articles that are available for inclusion in an inventory of another tenant, review of articles from other tenants for inclusion in a user storefront presented via user devices 204, and set, create, or modify values associated with listing one or more articles in a virtual inventory when these articles are purchased, involved in a TTB transaction, closeted, etc.

When web application hosting server 210 communicates with user devices 204 of one or more subscribing users 108, web application hosting server 210 may present a web-based user storefront interface integrating online retail components (e.g., online point-of-sale system) onto the user storefront interface. Web application hosting server 210 may communicate with the internal system 206 (e.g., the API endpoints 218, the APP endpoints 220, a device 202 or 204 logged into the internal system 206), to retrieve necessary information about the internal system 206, and to generate or dynamically update an inventory exchange storefront for tenant devices 202 or a user storefront for user devices 204.

Each of the interfaces accessed by tenant devices 202 via internal applications for operations 216 may be dynamically-updated by web application hosting server 210. Applications 216 may allow tenant devices 204 to communicate with internal system 206 and with one or more external systems 212 to facilitate the operation and update of the above-described management and retailer storefront interfaces of the inventory exchange. API access communication links 250 may enable communication with external systems 212.

II.B. Supporting System(s)

External systems 212 may be configured to perform data analytics or other tasks that support inventory sharing operations performed by tenant aware services 224 and/or jobs 228. For example, external systems 212 may include one or more inventory recommendation systems 236, value recommendation systems 238, and payment systems 240.

Inventory recommendations, value recommendations, or both, may be generated based on analysis of a current physical inventory of a particular tenant 120, 136, 146 and historical data of one or more articles (e.g., closeting frequency, TTB or purchase frequency, etc.). The recommendations may further be made based on characteristics of articles in a tenant's inventory (e.g., style, size, color, pattern, manufacturer, brand, replacement cost, purchase cost, etc.), and historical performance of similar articles (e.g., articles sharing one or more characteristics with an article associated with the recommendation) or of identical articles. In particular, inventory recommendation systems 236 may recommend articles that are highly likely to be requested (e.g., closeted) and actually worn by one or more users 108 based on historical data stored in data warehouse systems 230. This information may be supplied via API access 250 from data storage systems 226 and/or data warehouse systems 230.

Payment systems 240 may facilitate payments between tenants to facilitate inventory sharing. Payment systems 240 may, for example, facilitate payments between tenants with shared articles. Payment systems 240 may provide, a payment tool in the form of a cloud-based platform configured to accept payments from tenants with a website or within the platform's mobile application (e.g., tenant devices 202, 118, and/or 132). Payment systems 240 may generate invoices and/or reports based on a relationship between a plurality of tenants. For example, for a pair of tenants that each share articles to each other's storefront catalogs, payment systems 240 may be configured to review the shared articles in each inventory and generate reports and/or invoices by calculating a net difference between inventory listing fees and/or purchasing shares over a predetermined period of time (e.g., one month). Payment systems 240 may also include payment processing components to process payments and/or attempted transactions. Payment systems 240 may be accessed by tenant devices 202 to retrieve payments and utilize payment analytics data for business intelligence (e.g., by identifying articles that perform well, as indicated by having a closeting, TTB, or purchase frequency that is greater than a predetermined threshold).

External warehouse systems 256 may be configured to perform warehouse and/or distribution functions and services to support the internal system 206. For example, external warehouse systems 256 may perform functions that support processing, shipping, and/or storing articles. These functions may be performed in response to actions from user devices 204 interacting with internal system 206 via apps 208 and/or in response to actions from tenant devices 202 interacting with internal applications 216. One or more of the external warehouse systems 256 may be managed by an entity different from the internal system 206.

API access communication links 258 may enable communication between internal system 206 and the external warehouse systems 256. For example, the external warehouse systems 256 may communicate with API endpoints 218 of internal system 206. The external warehouse systems 256 and the internal system 206 may use an inbound communication model, an outbound communication model, and/or a hybrid communication model via API access communication links 258 to communicate with each other.

The inbound communication model may include communication from the external warehouse system 256 that informs the internal server system 206 about any changes in its own data. The inbound communication model may be implemented as a synchronous inbound communication model or an asynchronous inbound communication model. The synchronous inbound communication model may include the external warehouse system 256 making an API request via the API access communication links 258 to the internal server system 206. The external warehouse system 256 may wait for the internal server system 206 to update its internal record before the API request is complete. The asynchronous inbound communication model may allow for the external warehouse system 256 to avoid waiting for the internal server system 206 to update its internal record. The asynchronous inbound communication model may be implemented as either poll-based or event-based. The poll-based implementation may allow for the internal server system 206 to regularly poll the external warehouse system 256 using the APIs to detect changes and/or updates in data owned by the external warehouse system. The internal server system 206 may update its own internal records based on such changes and/or updates. The event-based implementation may allow for the external warehouse system 256 to initiate API requests via the API access communication links 258 to inform the internal server system 206 about data updates using events. The external warehouse system 256 would not need to wait for the internal server system 206 to update its internal records. The internal server system 206 may expose status APIs that the external warehouse system 256 may use to check if internal records of the internal server system 206 have been updated.

The outbound communication model may include communication from the internal server system 206 to the external warehouse system 256 that informs the external warehouse system 256 of changes to the internal server system's data. The outbound communication model may be implemented as a synchronous outbound communication model or an asynchronous outbound communication model. The synchronous outbound communication model may include the internal server system 206 making an API request via the API access communication links 258 to the external warehouse system 256. The internal server system 206 may then wait for the external warehouse system 256 to update its internal record before the API request is complete. The asynchronous outbound communication model may allow the internal server system 206 to avoid waiting for the external server system 256 to update its internal record. The asynchronous outbound communication model may be implemented as poll-based or event-based. The poll-based implementation may allow for the external warehouse system 256 to regularly poll the internal server system 206 using the APIs to detect changes and/or updates in data owned by the internal server system 206. The external warehouse system 256 may update its own internal records based on such changes and/or updates. The event-based implementation may allow for the internal server system 206 to initiate API requests via the API access communication links 258 to inform the external warehouse system 256 about data updates using events. The internal server system 206 may avoid waiting for the external warehouse system 256 to update its internal records. The external warehouse system 256 may expose some status APIs that the internal server system 206 can use to check whether the internal of the external warehouse system 256 have been updated.

The hybrid communication model may include an inbound communication model and an outbound communication model. The inbound communication model may include the external warehouse system 256 exposing some or all of the entities described below as REST APIs, which allows for CRUD operations on such entities. The internal server system 206 may use the poll-based implementation to regularly poll the external warehouse system 256 using scheduled jobs and the APIs, in order to get the latest data updates from the external warehouse system 256. For example, the internal server system 206 may regularly fetch the Return Entity using APIs, in order to get the latest data on returned unique article identifiers. The external warehouse system 256 may also send near real-time events about changes in data, which is similar to the previously described event-based implementation. The internal server system 206 may use events to update its own internal records in a near real-time manner. If some events are missed, regular polling of APIs may take care of fetching the latest updates. Such a process may be fault-tolerant, where even if the external warehouse system's APIs/events are down for a period of time, the polling process should synchronize the latest updates to the internal server system 206.

As described in the previous paragraph, the external warehouse system 256 may expose some or all of the entities as REST APIs, which allows for CRUD operations on such entities. Regarding the outbound communication model, the internal server system 206 may use scheduled jobs to sync the latest data updates owned by the internal server system 206 to the external warehouse system 256. For example, the internal sever system 206 may regularly drop Order Entities using APIs to the external warehouse system 256. This is similar to the previously described event-based implementation. Additionally, the external warehouse system 256 may process updates using APIs in an asynchronous manner. The external warehouse system 256 may also provide status APIs to the internal server system 206, in order for the internal server system 206 to check if the latest updates are reflected in the external warehouse system's internal records. This is similar to the previously described event-based implementation. Such a process may be fault-tolerant, where even if the external warehouse system's APIs/events are down for a period of time, the regularly scheduled jobs should synchronize the latest updates of the external warehouse system 256.

Environment 200 may include tenant data and analytics systems 214 configured to analyze and present information relevant to an article exchange or other aspects of system 200. Tenant data and analytics systems 214 may include computing resources in communication with one or more components of internal system 206 that collect, store, and/or manage data and analytics associated with the one or more tenants 120, 136. One or more of the tenant data and analytics systems 214 may be located remotely from the internal system 206 (e.g., at tenant servers). Tenant data and analytics systems 214 may communicate with one or more components of internal system 206 using API access or file transfer link 254 over one or more networks 101 (FIG. 1). For example, tenant data and analytics systems 214 may communicate with API endpoints 218 of internal system 206, or receive files from third-party data ETL processes. Tenant data and analytics systems 214 may be accessed by tenant devices 202, and, which may correspond to tenant devices 118, 132, 142 (FIG. 1), and, if desired, to employee devices 116.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally or alternatively, a set of devices (e.g., one or more devices) of environment 200 may perform one or more functions described as being performed by another set of devices of environment 200.

III. Server System

FIG. 3 is a diagram showing the architecture of an exemplary server system 300 for facilitating inventory sharing, e.g., via an external warehouse system 397, for an electronic platform offering articles, such as wearable items, as a service. Server system 300 may correspond to server system 102 depicted in FIG. 1, and to internal system 206 depicted in FIG. 2.

Server system 300 may be accessed by a plurality of entities having different roles, such as users 306 (e.g., subscribing users of the CaaS electronic platform), hybrid tenants 308, supply tenants 310, demand tenants 312, and employees of the CaaS electronic platform, such as warehouse staff 314. Each of these entities may access server system 300 via authentication and access control 302.

Users 306 may correspond to users 108 (FIG. 1). Users 306 may use their computing devices (e.g., user devices 204) to access the server system 300, as recipients of the CaaS electronic platform services provided by the components of the server system 300. For example, the users 306 may be one or more registered subscribers who closet one or more articles by reviewing storefront catalogs of one or more tenants, and physically receive and wear the apparel that are distributed via the CaaS operations. Users 306 may log in to server system 300 to initiate tasks associated with one or more CaaS operations, such as, for example, account management, storefront catalog viewing, closeting items, providing return notifications, etc.

Supply tenants 310 may correspond to supply tenants 120. Supply tenants 310 may include entities whose physical inventory is at least partially made available and offered via the inventory exchange. Demand tenants 312 may correspond to demand tenants 136. Demand tenants 312 may include entities that have a reduced physical inventory or no physical inventory. Hybrid tenants 308 may have characteristics of both a supply tenant 310 and a demand tenant 312. Hybrid tenants 308 may have one or more storefront catalogs of inventory that is offered via the CaaS electronic platform via one or more tenant storefronts. The storefront catalog(s) may include articles of a physical inventory that includes a plurality of articles that were physically supplied to one or more warehouses as a physical inventory of the hybrid tenant 308. Thus, hybrid tenants 308 may correspond to additional tenants 146, as well as to one or more supply tenants 120 and/or demand tenants 136.

Warehouse staff 314 may correspond to employees 114 and other users of devices 116, and may access an internal warehouse operation portal 340 or other portals to support CaaS operations, as described below. Warehouse staff 314 or other employees 114 may log in to server system 300 and, via internal warehouse portal 340 or other portals may initiate, view, manage, enter data in, or perform administrative tasks related to warehouse and other operations. Warehouse staff 314 and/or other employees 114 may also access external warehouse system 397 via external warehouse APIs 372.

In order to control access to server system 300, entities 306-314 may communicate with authentication and access control component 302, which may grant access to the server system 300 only if the access-requesting entity is successfully authenticated based on the access control conditions corresponding to the particular entity. Access control conditions may be stored in a memory in communication with server system 300, and may be applied to a particular entity based on various entity-specific factors, such as, for example, the authorized role(s) of each entity, the device being used by each entity, the portal sought to be accessed, and/or the geographic location of each entity.

External services 318 may be services associated with tenant-specific storefronts. Services 318 may provide, for example, user support services, marketing and advertisement services, content management systems for building and updating each tenant-specific storefront, and analytics services for tracking and reporting the performance of the tenant-specific storefronts.

Tenant storefront 322 may include storefronts be accessed by users 306 for closeting articles included in one or more storefront catalogs, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, and/or microservices 356) using storefront combination API 326. Each tenant storefront 322 may present a plurality of articles for closeting by users 306. Additionally, tenant storefront 322 may communicate with the external warehouse systems 397 via external warehouse APIs 372.

Tenants 308, 310, 312 may access per tenant catalog content management system (CMS) 328. The per tenant catalog CMS 328 may comprise a portal that includes one or more user interfaces for communicating with tenants 308, 310, 312 to create, modify, and/or update one or more article catalogs for the tenant storefront 322 (e.g., catalogs of the storefront interface 324A for tenant A). Per tenant catalog CMS 328 may be in communication with the external services 318. External services 318 may include online storefront management services, including subcomponents, such as a storefront user interface building/updating tool and a dashboard for managing sales operations as orders, payments, and/or shipping. Data maintained by one or more of the external services 318 may also be communicated to the per tenant catalog CMS 328. Communication between the per tenant catalog CMS 328 and the external services 318 may be performed by, for example, storefront combination API 326, and/or data exchange over the one or more networks 101.

Tenant storefront 322 may be accessed by users 306 for closeting articles, and may include web-based user interfaces. In particular, tenant storefront 322 may include a different interface for each tenant, such as a storefront interface 324A unique to tenant A, a storefront interface 324B unique to tenant B, and a storefront interface 324N unique to tenant N. Each tenant-specific interface may include a shared core 324 common to all tenants. Tenant storefront 322 may communicate with other components of server system 300 (e.g., external services 318, per tenant catalog CMS 328, external warehouse APIs 372, and/or microservices 356) using storefront combination API 326. Each tenant storefront 322 may present a plurality of articles available for closeting by users 306. These articles may include one or more shared inventory articles, and in the case of a storefront of a demand tenant 312, may be entirely formed of articles shared via the inventory exchange.

Tenants 308, 310, 312 may access per tenant catalog content management system (CMS) 328. The per tenant catalog CMS 328 may comprise a portal that includes one or more user interfaces for communicating with tenants 308, 310, 312 to create, modify, and/or update one or more apparel catalogs for the tenant storefront 322 (e.g., storefront catalogs in the storefront interface 324A for tenant A). Per tenant catalog CMS 328 may be in communication with the external services 318. External services 318 may include online storefront management services, including subcomponents such as a storefront user interface building/updating tool and a dashboard for managing sales operations as orders, payments, and/or shipping. Data maintained by one or more of the external services 318 may also be communicated to the per tenant catalog CMS 328. Communication between per tenant catalog CMS 328 and external services 318 may be performed by, for example, storefront combination API 326, and/or data exchange over the one or more networks 101.

Tenants 308, 310, 312 may each access shared inventory CMS 330. Shared inventory CMS 330 may, in conjunction with inventory transfer portal 332, inventory management portal 334 and/or one or more additional portals, provide user interfaces for receiving inputs from tenants 308, 310, 312 to create, modify, and/or update how one or more exchange catalogs for the inventory exchange (e.g., article catalogs that may be viewed by one or more tenants 308, 310, 312 by inventory management portal 332) are presented to other tenants. In particular, shared inventory CMS 330 may allow tenants 308, 310, 312 to modify aspects of an exchange storefront (e.g., a storefront specific to the inventory exchange and accessible via inventory transfer portal 332) such as layout, design, etc. If desired, shared inventory CMS 330 may operate in conjunction with inventory management portal 334 to allow tenants 308, 310, 312 to add, modify, or remove particular articles listed in an exchange catalog (one or a group of articles that are offered by one or more tenants to other tenants via the exchange).

At the server system 300, warehouse staff 314 may access an internal warehouse operation portal 340. Warehouse staff 314 authorized for such access may be one or more employees associated with warehouse operations of the CaaS electronic platform of the server system 300. Internal warehouse portal 340 may include one or more user interfaces at which warehouse staff 314 may, for example, initiate, view, manage, enter data in, or perform administrative tasks related to warehouse operations. The internal warehouse portal 340 may communicate with microservices 356, including, for example, internal warehouse APIs 370. Among the internal warehouse APIs 370, service components that may communicate with the internal warehouse operation portal 340 may be, for example, order processing, item photoshoot, inventory, inventory location, garment allocation, order fulfillment, shipping label management, package and shipment operations, return processing, laundry, and cycle count.

Internal warehouse APIs 370 may facilitate the management of shared inventories that are located in one or more distribution centers, such that a particular warehouse may include articles that are shared between a plurality of tenants among tenants 308, 310, 312. Internal warehouse APIs 370 may facilitate the management of article allocation via one or more databases, for example. Data for a particular shared article that is managed via internal warehouse APIs 370 may identify each tenant that is sharing the article, the tenant that supplied the article, and other data stored in data warehouse 390.

Portals 332, 334, 336, and 340 may communicate with one or more components of microservices 356 and/or external services 318 and 397 via one or more suitable APIs and/or over the one or more networks 101. Suitable APIs may include, for example, API access communication links 250, 254, and/or 258 (FIG. 2). In at least some configurations, portals 332, 334, 336, and/or 340 may correspond to internal applications for operations 216, external systems 212, and/or external warehouse systems 397 (FIGS. 2 and 3).

Within server system 300, a group of hosts (e.g., computing resources) may form a job execution cluster 344. Job execution cluster 344 may utilize the combined computing power and shared resources of the hosts to process one or more jobs (e.g., workloads) of server system 300. Job execution cluster 344 may, for example, dynamically allocate the combined computing power and the shared resources of the hosts, to perform one or more jobs associated with storefront, back office, and external warehouse system tasks. For a plurality of different jobs, the allocation of the computing power and the resources may be prioritized based on predetermined criteria, such as, for example, criticality, cost, time/order of receipt, and/or urgency.

Job execution cluster 344 may be configured to execute inventory exchange jobs 345, storefront jobs 346, and back office jobs 348. Inventory exchange jobs 345 may configure job execution cluster 344 to perform background tasks triggered by one or more actions of tenants 308, 310, 312. These tasks may be triggered by an interaction with one or more of portals 332, 334, 336. For example, if a user orders a wearable item, or a tenant markets a particular group identifier for retirement, job execution cluster 344 may perform tasks, such as calling one or more APIs among microservices 356. These APIs may include, for example, user authentication (e.g., password login), article recommendation, value recommendation, article inventory assignment, article value assignment, catalog update, payment, etc.), and warehouse communication.

Storefront jobs 346 may configure job execution cluster 344 to perform background tasks triggered by actions of users 306 at tenant storefront 322. For example, if a first user among users 306 initiated an order for one or more garments for shipment to the first user, job execution cluster 344 may execute a series of tasks under storefront jobs 346. Inventory exchange jobs 345 and storefront jobs 346 may be performed on demand at server system 300, whenever tenant or user actions are received at inventory exchange (e.g., via portals 332, 334, 336) or tenant storefront 322.

Back office jobs 348 may configure the job execution cluster 344 to perform tasks such as periodic data refresh 350, periodic synchronization states 352, and automated background tasks 354. In some implementations, back office jobs 348 may correspond to, or include, jobs 228 (FIG. 2). Job execution cluster 344 may execute jobs scheduled under periodic data refresh 350, in accordance with one or more predetermined data refresh schedules. During each iteration of a job under periodic data refresh 350, applicable variable data (e.g., metrics, scores, recommendation outputs, prices, etc.) stored in databases associated with data warehouse 390 may be refreshed based on the values of the input parameters captured at the time of execution. For example, periodic data refresh 350 may refresh the values and/or data associated with the inventory exchange, such as inventory assignment, article valuation, catalog revenue, article and/or value recommendations, etc. Periodic data refresh 350 may also refresh values and/or data associated with user functions, such as matching and fulfillment operations, pricing, achievable service level (ASL) and item retirement, discovery and recommendation, and other data science jobs.

Job execution cluster 344 may also execute one or more jobs scheduled under periodic synchronization states 352. For example, a job under periodic synchronization states 352 may synchronize states between microservices 356 and external states (e.g., external services 318). Job execution cluster 344 may execute jobs scheduled under automated background tasks 354, such as tasks triggered from portals 332, 334, 336 based on actions of tenants 308, 310, 312. A job under automated background tasks 354 may also be generated in response to an action of one or more employees such as warehouse staff 314.

Server system 300 may include microservices 356 that are available for deployment as APIs. Microservices 356 may correspond to the tenant aware services 224 depicted in FIG. 2. Microservices 356 may be services hosted at the virtual private clouds, as shown in FIG. 2, and may include catalog 358, inventory exchange 360, account 362, value assessment 364, exchange facilitation APIs 366, shared inventory tracking APIs 368, internal warehouse APIs 370, and external warehouse APIs 372. Microservices 356 may interact with external warehouse systems 397. For example, external warehouse APIs 372 may interact with external warehouse systems 397 to retrieve an inventory snapshot, drop an order, and/or return an article.

Catalog 358 may include service components such as, for example, products (e.g., item attributes and identifiers), collections (e.g., groups of products), and/or size charts (e.g., size charts specific to tenants 308, or canonical sizes set internally for server system 300). Catalog 358 microservices may be useful for maintaining and managing interactions with tenant storefronts 322 and storefront catalogs. Catalog 358 may include service components for associating each article and/or group of articles with one or more storefronts associated with the article or group.

Inventory exchange 360 may include service components for articles (e.g., article attributes and identifiers), collections (e.g., groups of articles), or both. In particular, inventory exchange 360 may include service components for matching individual articles (e.g., individual article identifiers) and/or groups of articles (e.g., group article identifiers) with identities (e.g., unique identifiers and/or storefront identifiers) of each tenant or groups of tenants. For example, inventory exchange 360 may pair tenant identities with identities of articles supplied by the tenant (e.g., a physical inventory of the tenant). Inventory exchange 360 may also associate articles with a particular exchange storefront and may be useful for maintaining or managing interactions with exchange storefronts or other interfaces facilitated by portals 332, 334, 336.

Account 362 may include service components such as, for example, new account creation, password login, social network login, password reset, single sign-on function(s), and/or session renewal function(s). These service components may be activated by users 306 for accessing storefronts 322, tenants 308, 310, 312 for accessing per tenant catalog CMS 328, shared inventory CMS 330, inventory transfer portal 332, inventory management portal 334, and/or exchange facilitation portal 336, or by warehouse staff 314 for accessing internal warehouse operation portal 340.

Value assessment and assignment 364 services may include service components for assigning one or more of an inventory listing value, exchange listing value, and/or purchasing share for articles. These service components may initiate communication with value recommendation systems 238 or, when value recommendation systems 238 are included in internal system 206, may include components for calculating an appropriate inventory listing value, exchange listing value, and/or purchasing share for one or more articles.

Exchange facilitation APIs 366 may include one or more service components initiated by interactions (e.g., by one or more facilitation tenants) with exchange facilitation portal 336. Exchange facilitation APIs 366 may include service components for inter-tenant communication (e.g., inter-tenant article suggestions, inter-tenant fee structure suggestions, inter-tenant negotiations, etc.).

Shared inventory tracking APIs 368 include service components for shared inventory management and article monitoring. For example, shared inventory tracking APIs 368 may include service components for shared article assignment (e.g., creating, modifying, and removing associations between one or more articles and a plurality of catalogs of different tenants) and inventory status (e.g., creating or updating data identifying users 306 currently in possession of one or more articles and an identity of the tenant associated with the storefront form which the one or more articles were closeted). For example, shared inventory tracking APIs 368 may monitor a quantity of physical articles available, and modify storefront catalogs of one or more tenants when an entirety of these articles are selected by users 306 and depleted. Thus, shared inventory tracking APIs 368 may facilitate real-time allocation of shared articles.

Internal warehouse APIs 370 may include service components such as, for example, order processing, photoshoot (e.g., capturing electronic images of articles being made available for rental or purchase transactions), warehouse inventory (e.g., computer-implemented functions associated with inventory management of items to be rented or purchased), warehouse location (e.g., locating item in a warehouse), garment allocation (e.g., allocating certain items for shipment to a particular user), fulfillment (e.g., fulfilling initiated orders), shipping label (e.g., generating, modifying, or outputting shipping labels), package and shipment (e.g., computer-implemented functions associated with packaging, sorting, and/or delivering the shipments out to users 306), return processing (e.g., processing return items that have been received at a warehouse), laundry (e.g., computer-implemented functions associated with performing laundry of the returned items), and/or cycle count (e.g., computer-implemented functions associated with counting cycles that each wearable item have gone through).

External warehouse APIs 372 may include data entities for allowing the internal server system and the external warehouse system to communicate with each other to provide subscription based rental and/or borrow services of wearable items to users. Example entities include an Inventory Snapshot Entity (e.g., computer-implemented functions associated with showing items available for order dropping), an Order Entity (e.g., computer-implemented functions associated with a third party warehouse receiving an order to fulfill), a Return Entity (e.g., computer-implemented functions associated with communicating a return of a unique article identifier to a third party warehouse), a Removal Entity (e.g., computer-implemented functions associated with communicating the removal of a unique article identifier from circulation in the third party warehouse), a UniqueIDInfo Entity (e.g., computer-implemented functions associated with marking a unique article identifier as temporarily unavailable), and/or a UniqueIDHistory Entity (e.g., computer-implemented functions to track the full movement history of a unique article identifier). External warehouse APIs 372 may use these exemplary entities and/or other entities to communicate with external warehouse systems 397. In addition to communication via external warehouse APIs 372, external warehouse systems 397 may include one or more systems for interfacing with affiliated warehouse staff (e.g., vendors, contractors, and/or third parties) of server system 102.

Microservices 356 may be in communication with a plurality of databases, including, for example, databases included in data warehouse 390. Data warehouse 390 may include one or more data repositories that are dynamically updated based on warehouse staff 314 interactions with internal warehouse operation portal 340. If desired, data warehouse 390 may be dynamically updated based on tenant interactions with per tenant catalog CMS 328, shared inventory CMS 330, portals 332, 334, and/or 336, etc.

At server system 300, an ETL system may extract, transform, and load various data outputs into data warehouse 390, so that data warehouse 390 may serve as a unified source of data that are used for business intelligence or business analytics, including analytics indicative of the performance of the external warehouse system 397. For example, the ETL system 388 may collect data from multiple different sources, convert the collected data to preset formats, and load the data into the data warehouse systems 390. In some implementations, the data warehouse 390 may correspond to the data warehouse systems 230 (FIG. 2).

As shown in FIG. 3, data warehouse 390 may be in communication with a report server 391. Report server 391 may be an external data visualization engine which may be configured to collect data from data warehouse 390 and generate reports focused on business intelligence and analytics. Reports may be scheduled and/or automated with preconfigured settings (e.g., applicable time periods, input parameters, output metrics, output format, etc.), to produce reports 395. Additionally, or alternatively, ad hoc requests may be received from one or more tenants 308, 310, 312, such that report server 391 may respond to the ad hoc requests by generating and communicating reports 395.

The number and arrangement of devices, components, and communication networks shown in FIG. 3 are provided as an example. In practice, there may be additional devices, components, and/or communication networks, fewer devices, components, and/or communication networks, different devices, components, and/or communication networks, or differently arranged devices, components, and/or communication networks than those shown in FIG. 3. Furthermore, two or more devices shown in FIG. 3 may be implemented within a single device, or a single device shown in FIG. 3 may be implemented as multiple, distributed devices. Additionally or alternatively, a set of devices (e.g., one or more devices) associated with server system 300 may perform one or more functions described as being performed by another set of devices associated with server system 300.

Figure 4:
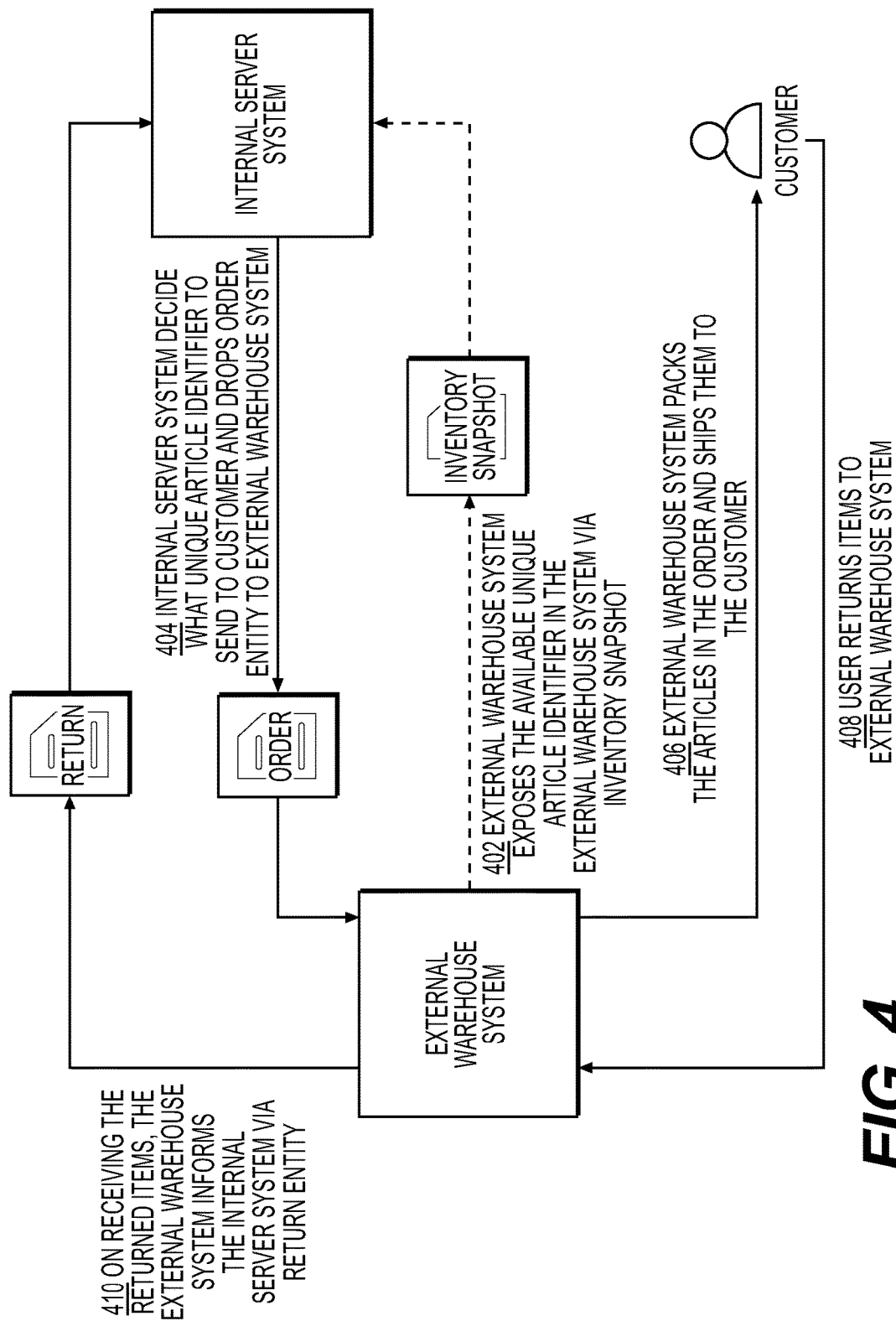
FIG. 4 is a flowchart showing an exemplary method of a circulation flow, according to one or more embodiments.

FIG. 4 is a flowchart showing an exemplary method 400 of a circulation flow, according to one or more embodiments.

The external warehouse system (e.g., external warehouse system 124) may reveal available unique article identifiers in the external warehouse system (e.g., external warehouse system 124) via an Inventory Snapshot Entity (Step 402). In order for the internal server system (e.g., internal server system 102) to manage the display and availability of articles (e.g., clothing items, wearables, etc.) to users, the internal server system (e.g., internal server system 102) may be aware of all of the unique article identifiers that are available in the external warehouse system (e.g., external warehouse system 124, 256, 397) at any given time. The external warehouse system may share this information using an Inventory Snapshot Entity (InventoryInfo Entity). The Inventory Snapshot Entity may provide the internal server system with a list of all unique article identifiers available in the external warehouse system at a particular point in time. This results in the internal server system receiving real-time, or near real-time, item information, where the internal server system has an accurate picture of the articles available for shipping to users from the external warehouse system. For example, the Inventory Snapshot Entity may include a "unique article identifier" field that identifies the unique article identifier that is available at the external warehouse (e.g., a warehouse managed via external warehouse system 124, 256, 397) for order dropping. Order dropping may include, for example, sending an order to the external warehouse system, for the external warehouse system to fulfill. The Inventory Snapshot Entity may include multiple "unique article identifier" fields that identify several available unique article identifiers (and their corresponding articles). Additionally, for example, the Inventory Snapshot Entity may allow for the internal server system to display all of the unique article identifiers within the Inventory Snapshot Entity.

The internal server system may determine which unique article identifiers to physically ship to a user and, in response to this determination, drop an Order Entity to the external warehouse system, where the Order Entity indicates such unique article identifiers (Step 404). For example, the internal server system may select a set of unique article identifiers, which correspond to a set of articles (e.g., clothing items, wearables, etc.) to be sent to a user, and then communicate such selection via the Order Entity. Such a process may be referred to as "dropping" the order to the external warehouse system. Upon receiving the Order Entity, the external warehouse system may pick the selected set of articles, pack them, and then ship the selected set of articles to the user.

The Order Entity may contain data (e.g., fields), that describe, for example, order information, tenant information, status, priority, group identifier information, return bag information, user information, a creation date, and/or an update date. The internal server system and the external warehouse system may each set one of such fields. The order information may include a unique identifier associated with the order, which is generated (set) by the external warehouse system. The order information may also include an identifier generated (set) by the internal server system, where the identifier may be associated with multiple orders but only one active order. The tenant information may include a tenant name and/or a unique tenant identifier representing the tenant. The status information may specify the received status of the order. For example, a status may include the following: an "open" status, an "allocated" status, a "processing" status, a "processed" status, a "rejected" status, and/or a "cancelled" status. The internal server system may mark (set) the "open" status and the "cancelled" status. The external warehouse system may mark (set) the "allocated" status, the "processed" status, and/or the "rejected" status. The internal server system may specify priority information for a given order. The return bag information may include the number of return bags to be sent with the shipment order (indicated by the internal server system), and/or a tracking code and carrier for each of the return bags (both indicated by the external warehouse system). The group identifier information may include a type, a unique article identifier, a status, a tracking code and carrier, and/or an outbound box type. The user information may include a user name, an address, a phone number, and/or an email. The creation date may correspond to a timestamp indicating when the Order Entity was created in the external warehouse system. The update date may correspond to a timestamp indicating when the Order Entity was updated in the external warehouse system.

Upon receiving the Order Entity, the external warehouse system may pack the selected articles in the order and ship such articles to a user (Step 406). The external warehouse system may use the Order Entity information to determine which user should receive the articles, as well as the number of return bags to send in the order.

After keeping the articles for a certain period of time, the user may return the articles by shipping such articles back to the external warehouse system (Step 408).

Upon receiving the returned items, the external warehouse system may inform the internal server system of the returned items via a Return Entity (Step 410). For example, the user may send the returned articles back to the external warehouse system. Upon receiving these articles, the external warehouse system may accept the articles. The external warehouse system may then communicate the return of the articles to the internal server system by the Return Entity. The Return Entity may include return information, such as a return identifier, a plurality of unique article identifiers representing each returned article, and/or a creation date. The external warehouse system may generate a return identifier for the plurality of unique article identifiers. The creation date may correspond to a timestamp indicating when the Return Entity was created in the external warehouse system.

Once the external warehouse system communicates the return of the articles to the internal server system. The internal server system may then calculate the total charges for the user's account (in the case of a "borrow" service) or prepare the next set of articles (in the case of a "subscription" service) by requesting an Inventory Snapshot Entity.

Figure 5:
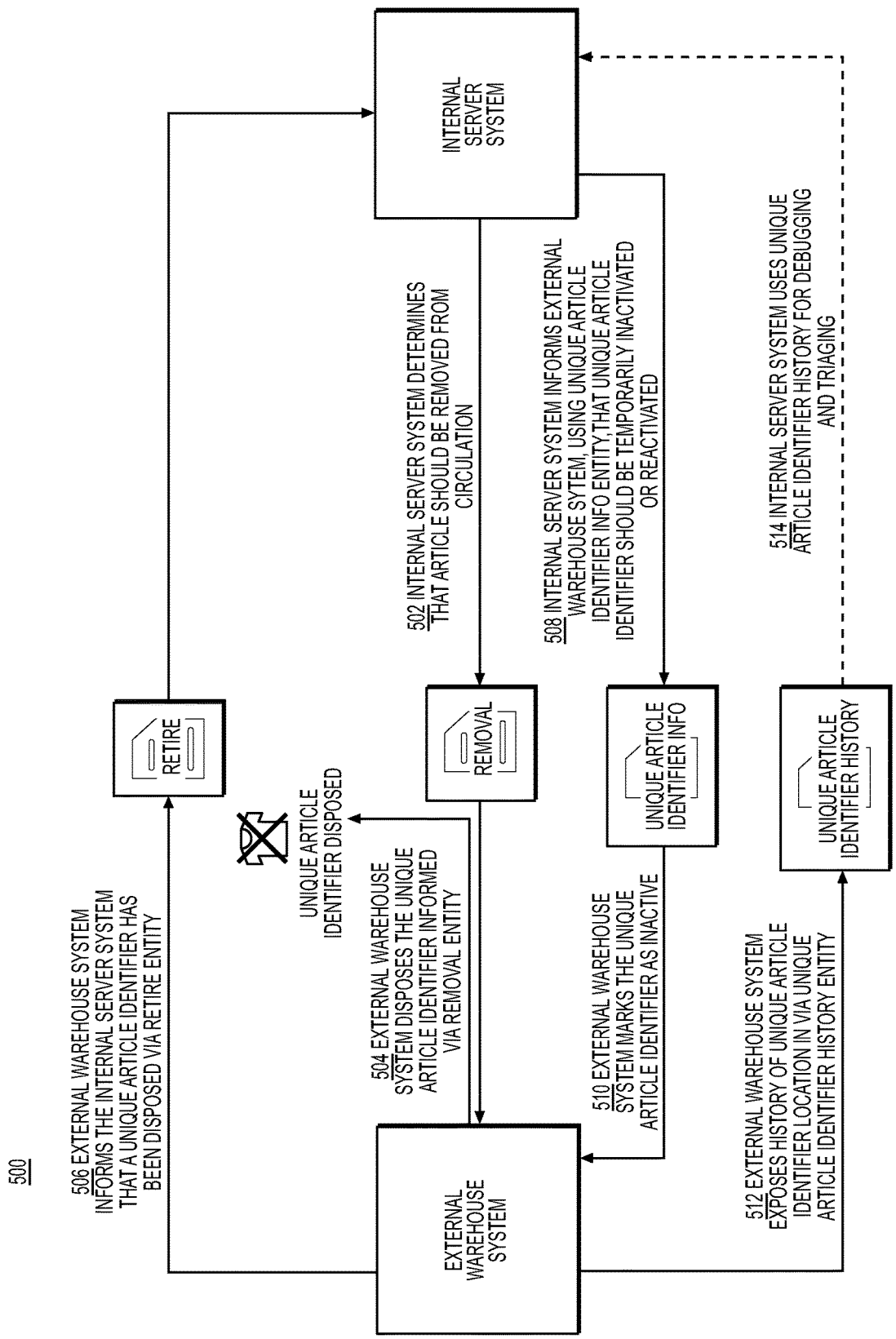
FIG. 5 is a flowchart showing an exemplary method for a Removal Entity, a Retire Entity, a UniqueIDInfo Entity, and a UniqueIDHistory Entity, according to one or more embodiments.

FIG. 5 is a flowchart showing an exemplary method 500 for a Removal Entity, a Retire Entity, a UniqueIDInfo Entity, and a UniqueIDHistory Entity, according to one or more embodiments.

The internal server system may inform the external warehouse system via a Removal Entity that one or more unique article identifier should be deactivated/removed from circulation (Step 502). For example, a particular group identifier, such as a SKU, may have been discontinued, or a particular unique article lifecycle may end after a predetermined number of circulations to users. The internal server system may send a removal request to the external warehouse system via the Removal Entity. Once the external warehouse system receives the Removal Entity, the unique article identifier should no longer be available in an inventory snapshot. Additionally, if the article corresponding to the unique article identifier is available in the external warehouse system, the external warehouse system may eventually deactivate/dispose of the article corresponding to the unique article identifier. The internal server system and/or the external warehouse system may be able to track the progress of the removal by checking the status of the Removal Entity.

The Removal Entity may include the unique article identifier, a status, a creation date, and/or an update date. The status may correspond to the removal status of the unique article identifier. For example, the status may include at least one of: a "removal requested" status, an "in progress" status, and/or a "removed" status. The "removal requested" status may correspond to an initial status that denotes that the removal is requested. Once a Removal Entity is created, the unique article identifier may not be available in an Inventory Snapshot Entity. The "in progress" status may correspond to a secondary status that indicates that the removal of the unique article identifier is in progress. The "removed" status may correspond to an additional status that indicates that the unique article identifier was removed successfully. Additionally, the internal server system may set the value for the "removal requested" status, where the external warehouse system may set the value for the "in progress" status and/or the "removed" status. The creation date may correspond to a timestamp indicating when the entity was created in the external warehouse system. The update date may correspond to a timestamp indicating when the external warehouse system changed the status.

In response to receiving the Removal Entity, the external warehouse system may deactivate/dispose of the unique article identifier (Step 504).

Alternatively, the external warehouse system may independently determine (e.g., without being informed by the internal server system 102) that a unique article identifier is no longer useable and, as a result, deactivate/dispose of such unique article identifier (Step 506). For example, the external warehouse system may employ a Retire Entity to inform the internal server system that such a unique article identifier has been deactivated/disposed.

In an additional or alternative implementation, the internal server system may decide that a unique article identifier should be temporarily made inactive, or an already inactive unique article identifier should be made active, and the internal server system may use a UniqueIDInfo Entity to inform the external warehouse system of a corresponding request (Step 508).

In some situations, the internal server system may mark a unique article identifier as temporarily unavailable. The internal server system may use the UniqueIDInfo Entity to communicate such information to the external warehouse system. The UniqueIDInfo Entity may also be used to change the unique article identifier and/or other unique article identifier metadata. More specifically, the UniqueIDInfo Entity may include a unique article internal identifier, the unique article identifier, an "isActive" field, a creation date, and/or an update date. The unique article internal identifier may correspond to a unique article internal identifier generated by the external warehouse system. The "isActive" field may indicate whether the unique article identifier is active or not. Additionally, once the unique article identifier is marked as inactive, the unique article identifier should not be selected for fulfilling an order. Moreover, an inactive unique article identifier may not be included in an inventory snapshot unless the unique article identifier is marked active. The creation date may correspond to a timestamp indicating when the external warehouse system created the UniqueIDInfo Entity. The update date may correspond to a timestamp indicating when the external warehouse system updates the UniqueIDInfo Entity.

In response to receiving the UniqueIDInfo Entity from the internal server system, the external warehouse system may mark the unique article identifier as inactive, resulting in the unique article identifier not being available in the Inventory Snapshot Entity (Step 510).

The external warehouse system may transmit the entire location history of the unique article identifier via a UniqueIDHistory Entity (Step 512). In order to retrieve the full movement history of the unique article identifier, the external warehouse system may transmit a UniqueIDHistory Entity to the internal server system. Such entity may not be used in day-to-day functions, but the UniqueIDHistory Entity may be used for triaging and debugging purposes.

More specifically, the UniqueIDHistory Entity may include information, such as the unique article identifier, history information, and a creation date. The history information may include location information, status information, attribute information, a UniqueIDHistory Entity create date, and/or a creation date of each entry. The history location information may include an associated location of the unique article identifier at a given time. The history location information may also be exposed by the external warehouse system. Possible history location values may include at least one of: receiving (e.g., the external warehouse system receiving the unique article identifier for the first time), circulation (e.g., the unique article identifier is available as part of the inventory snapshot and the unique article identifier is also ready to be associated with an order), order (e.g., the unique article identifier has been associated with an Order Entity and will eventually be shipped to a customer), return (e.g., the external warehouse system has received the unique article identifier after being returned by a customer), retire (e.g., the unique article identifier has been marked for retirement and will eventually be disposed), or remove (e.g., the internal server system has marked the unique article identifier for removal and the unique article identifier will eventually be deactivated/disposed). The history status information may indicate the status of a unique article identifier at a given point in time. Possible history status values may include at least one of: a receiving status, a circulation status, an order status, a return status, a retire status, and a remove status. More specifically, the receiving status may have at least one of the following sub-statuses: unused (e.g., the unique article identifier is yet to be received), processing (e.g., the unique article identifier is being received), and/or received (e.g., the unique article identifier has been fully received and all electronic systems have been updated). The circulation status may have at least one of the following sub-statuses: active (e.g., the unique article identifier is ready to be associated with an order) and/or missing (e.g., the unique article identifier should have been ready to be associated with an order, but was found to be physically missing from the external warehouse system). The order status may have at least one of the following sub-statuses: allocated (e.g., the unique article identifier is associated with an order), processed (e.g., the unique article identifier is being processed (i.e. picked, packed, and eventually shipped to the customer)), and/or missing (e.g., the unique article identifier was found to be physically missing when the unique article identifier was being processed for an order). The remove status may have at least one of the following sub-statuses: removal requested (e.g., the unique article identifier has been marked for removal by the internal server system), in progress (e.g., the unique article identifier removal is in progress), and/or removed (e.g., the removal process has been completed by the external warehouse system). The history status information may also be exposed by the external warehouse system. The attribute information may include a JSON object with various key-value pairs providing additional information related to a unique article identifier's location. The creation date may correspond to a timestamp indicating when the external warehouse system created the UniqueIDHistory Entity. Additionally, each entry of history information may also have a corresponding timestamp indicating when the external warehouse system created the entry.

The internal server system may use the UniqueIDHistory Entity for debugging and triaging (Step 514). Additionally, the internal server system may request an audit of all of the unique article identifiers present in the external warehouse system. This may be done as part of a reconciliation exercise to get an up-to-date status of each unique article identifier located in the external warehouse system. For example, for a unique article identifier with a value of "ABC123-1," where the unique article is in circulation, then the possible sub-status may be either active or missing.

Figure 6:
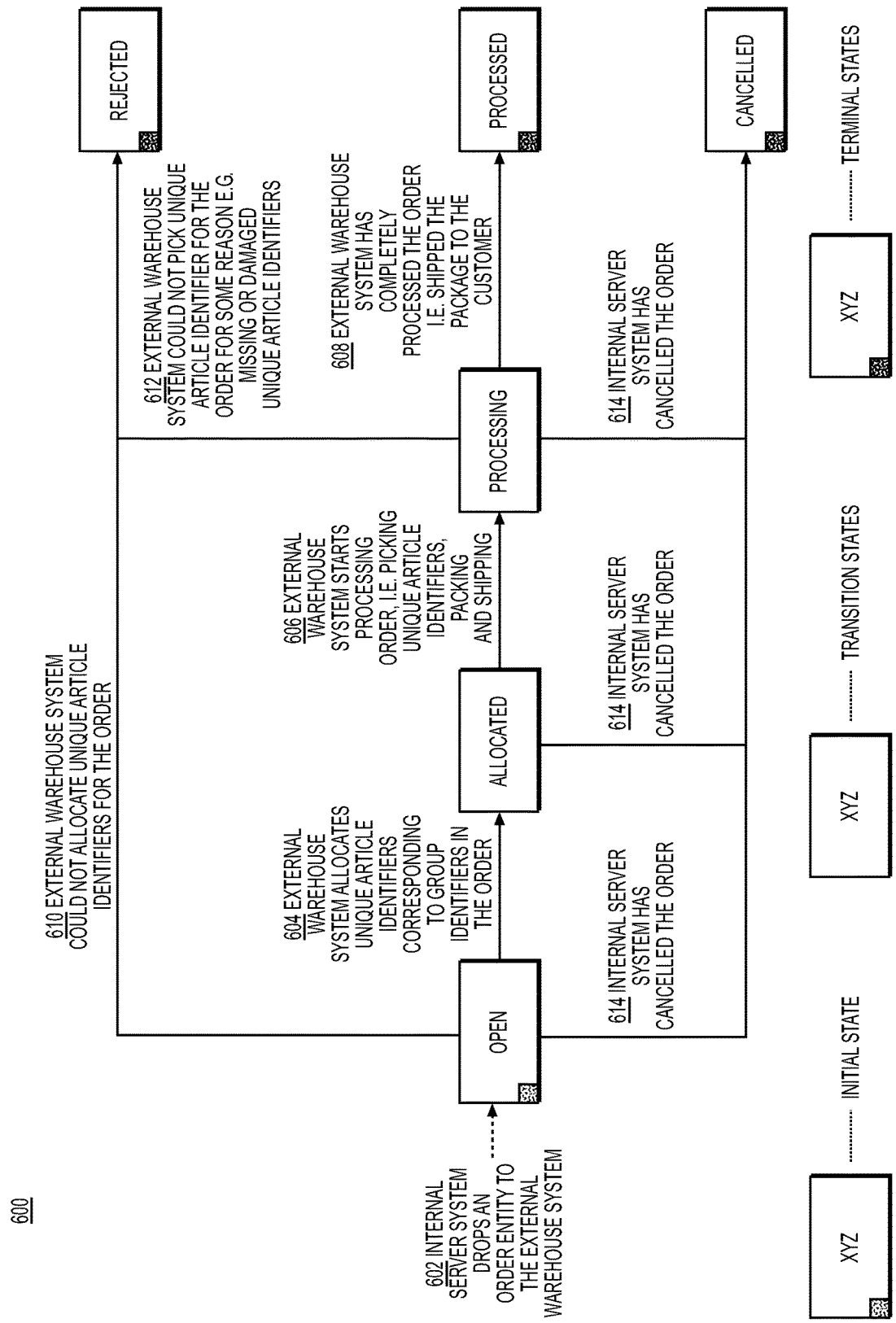
FIG. 6 is a flowchart showing an exemplary method of an order state lifecycle, according to one or more embodiments.

FIG. 6 is a flowchart showing an exemplary method 600 of an order state lifecycle, according to one or more embodiments.

In method 600, the internal server system may drop an Order Entity to the external warehouse system, resulting in an "open" state (Step 602), the open state representing that the order has been dropped. If the external warehouse system cannot allocate one or more of the unique article identifiers for the order, the state may be "rejected" (Step 610). Alternatively, when sufficient articles are available for allocation, the external warehouse system may allocate unique article identifiers corresponding to group identifiers (e.g., SKUs) in the order, resulting in an "allocated" state (Step 604).

The external warehouse system may then start processing the order (i.e., selecting unique article identifiers, packing articles corresponding to the unique article identifiers, and shipping such articles), resulting in a "processing" state (Step 606). However, if the external warehouse system cannot select the articles corresponding to the unique article identifiers during this processing state (e.g., when one or more articles corresponding to the unique article identifiers are missing or damaged), the state may be "rejected" (Step 612).

The external warehouse system may complete processing of the order (i.e., shipped the articles to the user), resulting in a "processed" state (Step 608). Furthermore, throughout the order process, the internal server system may cancel the order at any time (Step 614).

Figure 7:
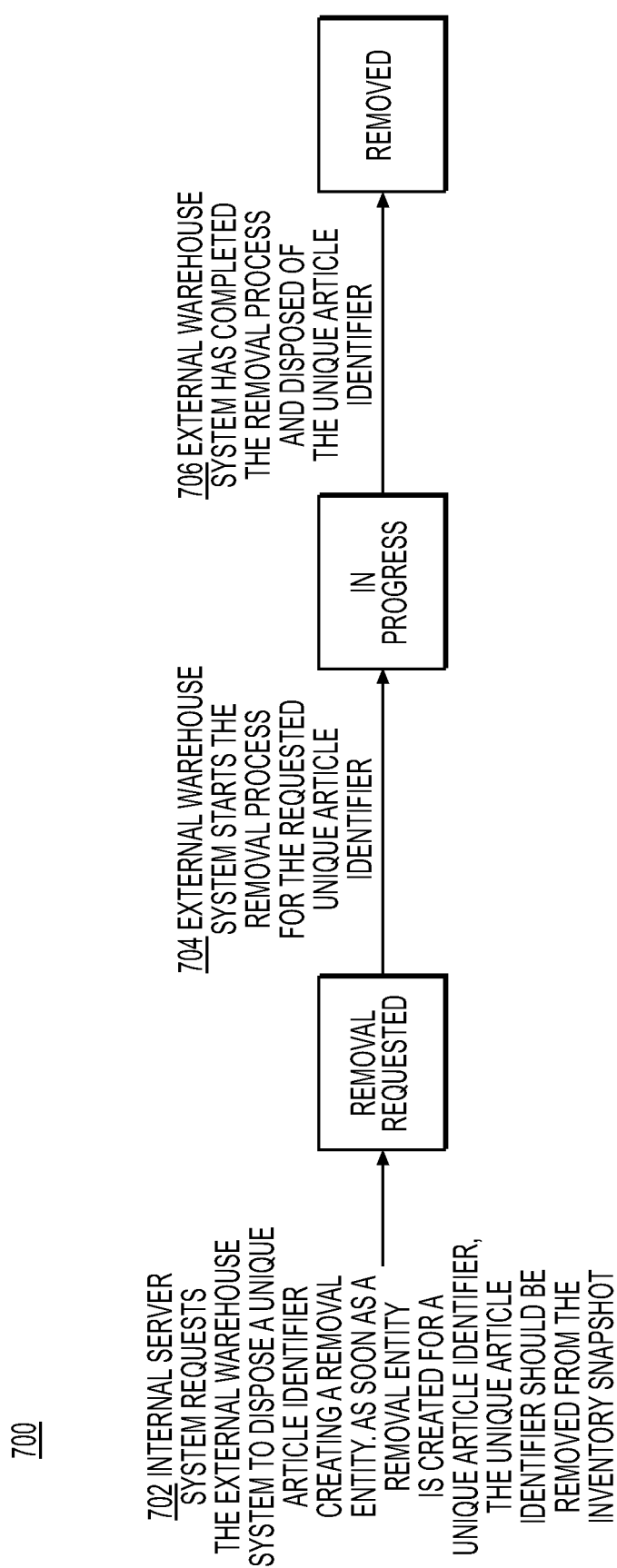
FIG. 7 is a flowchart showing an exemplary method of a removal status lifecycle, according to one or more embodiments.

FIG. 7 is a flowchart showing an exemplary method 700 of a removal status lifecycle, according to one or more embodiments. In method 700, the internal server system may generate a request via a Removal Entity for the external warehouse system to deactivate/dispose of a unique article identifier, resulting in a "removal requested" initial state (Step 702). Additionally, the Removal Entity may indicate that a unique article identifier should be removed from the inventory snapshot. Upon receipt of the Removal Entity, the external warehouse system may start the removal process of the requested unique article identifier, resulting in an "in progress" transition state (Step 704). The external warehouse system may complete the removal process and dispose of the unique article identifier, resulting in a "removed" terminal state (Step 706).

FIG. 8 is a flowchart showing an exemplary method 800 for communicating between an internal server system and an external warehouse system for a plurality of articles, according to one or more embodiments.

In method 800, the internal server system may receive an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles (Step 802). If desired, the internal server system may include an internal warehouse system, or may be configured for communication solely with one or more external warehouse systems.

In response to the receiving, the internal server system may select the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier (Step 804).

The Order Entity may also include at least one internal field set by the internal server system and at least one external field set by the external warehouse system. The at least one internal field may include at least one of: an internal identifier generated by the internal server system, a priority, a number of return bags to send with the shipment, group identifier information, an open order status, or a cancelled order status. The at least one external field may include at least one of: an external identifier generated by the external warehouse system, an allocated order status, a processed order status, or a rejected order status.

The internal server system may drop the Order Entity to the external warehouse system, the external warehouse system selecting and preparing each article corresponding to the external warehouse unique identifier in the Order Entity for shipment (Step 806). Dropping the Order Entity may include sending the Order Entity to the external warehouse system, for the external warehouse system to begin fulfilling an order corresponding to the Order Entity.

The internal server system may then receive a Return Entity from the external warehouse system indicating that the external warehouse system received the article, the Return Entity including the at least one unique article identifier corresponding to at least one article and an external warehouse unique return identifier (Step 808).

In response to receiving the Return Entity, the internal server system may update one or more article databases to indicate receiving one or more articles corresponding to the one or more unique article identifiers (Step 810).

Although FIG. 8 shows example blocks of an exemplary method 800, in some implementations, the exemplary method 800 may include additional blocks, fewer blocks, different blocks, or differently arranged blocks than those depicted in FIG. 8. Additionally, or alternatively, two or more of the blocks of the exemplary method 800 may be performed in parallel.

FIGS. 9A-9D are flowcharts showing exemplary methods 900, 902, 904 and 906 for communicating between an internal server system and an external warehouse system for a plurality of articles, according to one or more embodiments.

The internal server system may receive a Unique Article Identifier History Entity (e.g., the UniqueIDHistory Entity) from the external warehouse system, the Unique Article Identifier History Entity including a unique article identifier location at a period of time (Step 908).

The internal server system may transmit a Unique Article Identifier Information Entity (e.g., the UniqueIDInfo Entity) to indicate to the external warehouse system that a unique article identifier has an "inactive" status or an "active" status, where the "inactive" status indicates that the unique article identifier should not be included in one or more future Inventory Snapshot Entities (Step 912). Additionally, the Unique Article Identifier Information Entity may include at least one of: the unique article identifier, an external unique article identifier generated by the external warehouse system, the "inactive" status, and/or the "active" status (Step 914).

The internal server system may send a Removal Entity requesting the external warehouse system to deactivate (e.g., dispose of) the one or more unique article identifiers, the external warehouse system removing the one or more unique article identifiers from an inventory of the external warehouse system (Step 916). The Removal Entity may include the one or more unique article identifiers, a removal status, a create date timestamp, and/or an update date timestamp corresponding to a change in the removal status (Step 918). Additionally, the removal status may include at least one of: a requested status indicating that the external warehouse system received the Removal Entity, an in progress status indicating that removal of the at least one unique article identifier has begun, and/or a removed status indicating that the one or more unique article identifiers have been removed from the inventory (Step 920).

The internal server system may associate the Order Entity with a particular tenant (e.g., the additional tenant devices 142, the demand tenant devices 132, and/or the supply tenant devices 118) (Step 922).

Although FIGS. 9A-9D show example blocks of exemplary methods 900, 902, and 904 in some implementations, the exemplary methods 900, 902, 904 and 906 may include additional blocks, fewer blocks, different blocks, or differently arranged blocks than those depicted in FIGS. 9A-9D. Additionally, or alternatively, two or more of the blocks of the exemplary methods 900, 902, 904 and 906 may be performed in parallel.

Figure 10:
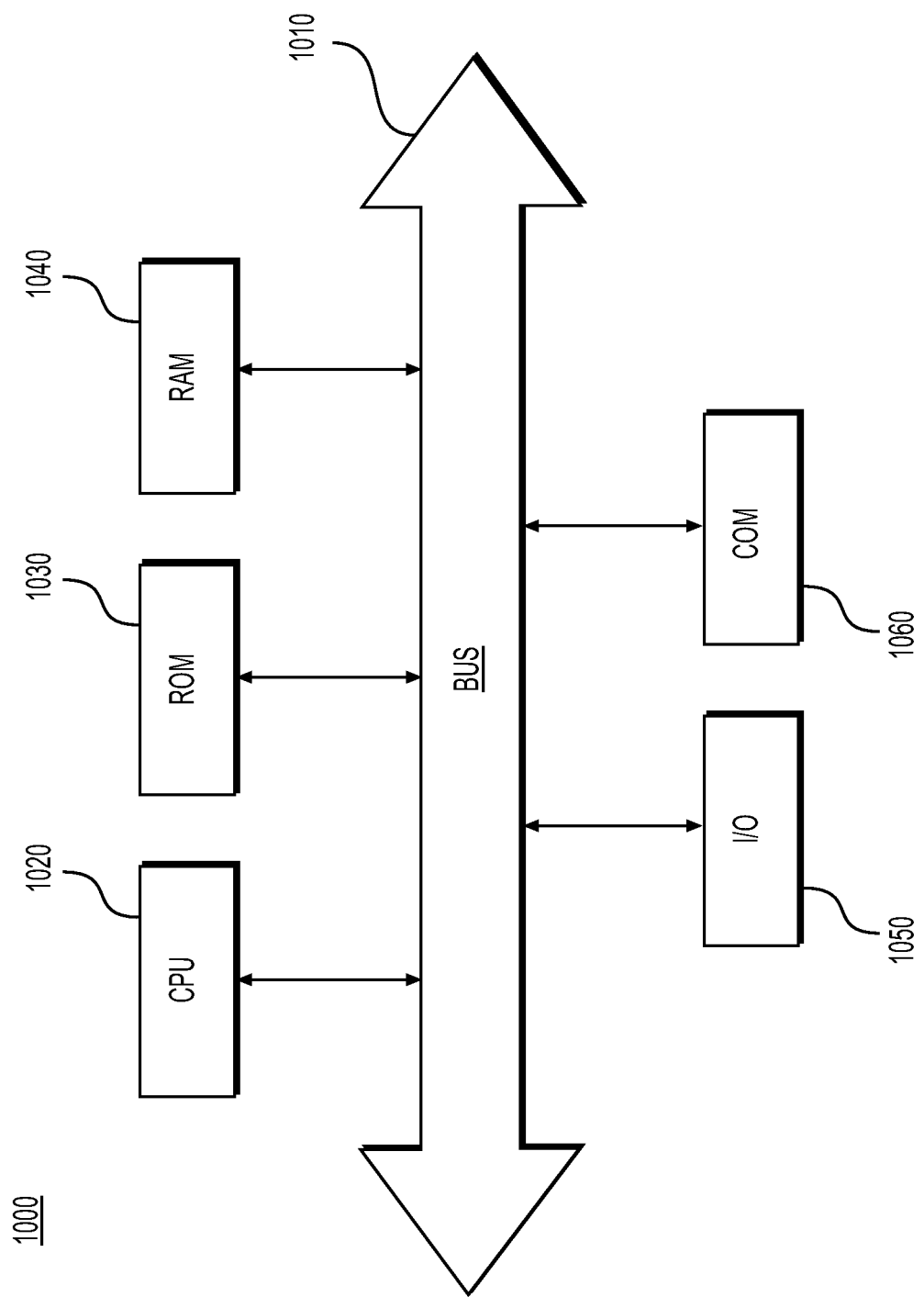
FIG. 10 depicts an exemplary computer device or system, in which embodiments of the present disclosure, or portions thereof, may be implemented.

The communication between the internal server system and the external warehouse system FIG. 10 depicts an exemplary computer device or system, in which embodiments of the present disclosure, or portions thereof, may be implemented. In some implementations, server system 102, user devices 112, employee devices 116, tenant devices 118 and/or 132, tenant devices 202, user devices 204, internal system 206, external systems 212, server system 300, and/or any other computer system or user terminal for performing the various embodiments of the present disclosure, may correspond to device 1000. Additionally, each of the exemplary computer servers, databases, user interfaces, modules, and methods described above with respect to FIGS. 1-9D can be implemented in device 1000 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-9D.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-9D, may be implemented using a processor device 1000. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 10, a device 1000 used for performing the various embodiments of the present disclosure (e.g., server system 102, user devices 112, employee devices 116, tenant devices 118, 132, tenant devices 202, user devices 204, the internal system 206, the external system(s) 212, server system 300, and/or any other computer system or user terminal for performing the various embodiments of the present disclosure) may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

A device 1000 (e.g., server system 102, user devices 112, employee devices 116, tenant devices 118, 132, tenant devices 202, user devices 204, internal system 206, external system(s) 212, server system 300, and/or any other computer system or user terminal for performing the various embodiments of the present disclosure) may also include a main memory 1040, for example, random access memory (RAM), and may also include a secondary memory 1030. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable (e.g., computer-readable) storage medium having stored therein computer software and/or data (e.g., instructions).

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

A device 1000 may also include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for communicating between an internal server system and an external warehouse system for a plurality of articles, the method comprising:

receiving, by the internal server system, an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles;

in response to the receiving, selecting, by the internal server system, the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier;

dropping, by the internal server system, the Order Entity to the external warehouse system, the external warehouse system selecting and preparing each article corresponding to the external warehouse unique identifier in the Order Entity for shipment;

receiving, by the internal server system, a Return Entity from the external warehouse system indicating that the external warehouse system received the article, the Return Entity including the one or more unique article identifiers corresponding to at least one article and an external warehouse unique return identifier; and in response to receiving the Return Entity, updating, by the internal server system, one or more article databases to indicate receiving one or more articles corresponding to the one or more unique article identifiers.

2. The computer-implemented method of claim 1, further comprising:

receiving, by the internal server system, a Unique Article Identifier History Entity from the external warehouse system, the Unique Article Identifier History Entity including a unique article identifier location at a period of time.

3. The computer-implemented method of claim 1, further comprising:

transmitting, by the internal server system, a Unique Article Identifier Information Entity to indicate to the external warehouse system that a unique article identifier has an inactive status or an active status, where the inactive status indicates that the unique article identifier should not be included in one or more future Inventory Snapshot Entities.

4. The computer-implemented method of claim 3, wherein the Unique Article Identifier Information Entity includes at least one of: the unique article identifier, an external unique article identifier generated by the external warehouse system, the inactive status, or the active status.

5. The computer-implemented method of claim 1, further comprising:

sending, by the internal server system, a Removal Entity requesting the external warehouse system to deactivate the one or more unique article identifiers, the external warehouse system removing the one or more unique article identifiers from an inventory of the external warehouse system.

6. The computer-implemented method of claim 5, wherein the Removal Entity includes the one or more unique article identifiers, a removal status, a create date timestamp, and an update date timestamp corresponding to a change in the removal status.

7. The computer-implemented method of claim 6, wherein the removal status includes at least one of: a requested status indicating that the external warehouse system received the Removal Entity, an in progress status indicating that removal of the one or more unique article identifiers has begun, and a removed status indicating that the one or more unique article identifiers have been removed from the inventory.

8. The computer-implemented method of claim 1, wherein the Order Entity includes at least one internal field set by the internal server system and at least one external field set by the external warehouse system.

9. The computer-implemented method of claim 8, wherein the at least one internal field includes at least one of: an internal identifier generated by the internal server system, a priority, a number of return bags to send with the shipment, group identifier information, an open order status, or a cancelled order status.

10. The computer-implemented method of claim 8, wherein the at least one external field includes at least one of: an external identifier generated by the external warehouse system, an allocated order status, a processed order status, or a rejected order status.

11. The computer-implemented method of claim 1, further comprising:
associating, by the internal server system, the Order Entity with a tenant identifier.

12. The computer-implemented method of claim 1, wherein the internal server system includes an internal warehouse system.

13. A computer system for communicating between an internal server system and an external warehouse system for a plurality of articles, the computer system comprising:
a memory having processor-readable instructions stored therein; and
one or more processors configured to access the memory and execute the processor-readable instructions, which when executed by the one or more processors configures the one or more processors to perform a plurality of functions, including functions for:
receiving, by the internal server system, an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles;
in response to the receiving, selecting, by the internal server system, the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier;
dropping, by the internal server system, the Order Entity to the external warehouse system, the external warehouse system selecting and preparing each article corresponding to the external warehouse unique identifier in the Order Entity for shipment;
receiving, by the internal server system, a Return Entity from the external warehouse system indicating that the external warehouse system received the article, the Return Entity including the one or more unique article identifiers corresponding to at least one article and an external warehouse unique return identifier; and
in response to receiving the Return Entity, updating, by the internal server system, one or more article databases to indicate receiving one or more articles corresponding to the one or more unique article identifiers.

14. The computer system of claim 13, further comprising:
receiving, by the internal server system, a Unique Article Identifier History Entity from the external warehouse system, the Unique Article Identifier History Entity including a unique article identifier location at a period of time.

15. The computer system of claim 13, further comprising:
transmitting, by the internal server system, a Unique Article Identifier Information Entity to indicate to the external warehouse system that a unique article identifier has an inactive status or an active status, where the inactive status indicates that the unique article identifier should not be included in one or more future Inventory Snapshot Entities.

16. The computer system of claim 15, wherein the Unique Article Identifier Information Entity includes at least one of: the unique article identifier, an external unique article identifier generated by the external warehouse system, the inactive status, or the active status.

17. The computer system of claim 13, further comprising:
sending, by the internal server system, a Removal Entity requesting the external warehouse system to deactivate the one or more unique article identifiers, the external warehouse system removing the one or more unique article identifiers from an inventory of the external warehouse system.

18. The computer system of claim 17, wherein the Removal Entity includes the one or more unique article identifiers, a removal status, a create date timestamp, and an update date timestamp corresponding to a change in the removal status.

19. A non-transitory computer-readable medium containing instructions for performing functions for communicating between an internal server system and an external warehouse system for a plurality of articles, the functions comprising:
receiving an Inventory Snapshot Entity from the external warehouse system, the Inventory Snapshot Entity indicating a one or more unique article identifiers that are currently available in the external warehouse system for order dropping, wherein the one or more unique article identifiers corresponds to an article of the plurality of articles;
in response to the receiving, selecting the one or more unique article identifiers from the Inventory Snapshot Entity to be included in an Order Entity, the Order Entity including the one or more unique article identifiers and a corresponding unique article identifier information for each of the one or more unique article identifiers, the corresponding unique article identifier information including an external warehouse unique identifier;
dropping the Order Entity to the external warehouse system, the external warehouse system selecting and preparing each article corresponding to the external warehouse unique identifier in the Order Entity for shipment;
receiving a Return Entity from the external warehouse system indicating that the external warehouse system received the article, the Return Entity including the one or more unique article identifiers corresponding to at least one article and an external warehouse unique return identifier; and in response to receiving the Return Entity, updating one or more article databases to indicate receiving one or more articles corresponding to the one or more unique article identifiers.

20. The non-transitory computer-readable medium of claim 19, wherein the Order Entity includes at least one internal field set by the internal server system and at least one external field set by the external warehouse system.

* * * * *